United States Patent
Yang et al.

(10) Patent No.: US 10,293,301 B2
(45) Date of Patent: May 21, 2019

(54) MODIFIED SILOXANE COMPOSITE MEMBRANES FOR HEAVY HYDROCARBON RECOVERY

(71) Applicant: Saudi Arabian Oil Company, Dhahran (SA)

(72) Inventors: John Yang, Acton, MA (US); Milind M. Vaidya, Foothill Ranch, CA (US); Veera Venkata R. Tammana, Ras Tanura (SA); Daniel Harrigan, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 118 days.

(21) Appl. No.: 15/428,662

(22) Filed: Feb. 9, 2017

(65) Prior Publication Data

US 2018/0221813 A1    Aug. 9, 2018

(51) Int. Cl.
 *B01D 53/22* (2006.01)
 *B01D 71/70* (2006.01)
 (Continued)

(52) U.S. Cl.
 CPC .......... *B01D 53/228* (2013.01); *B01D 69/02* (2013.01); *B01D 69/10* (2013.01); *B01D 69/12* (2013.01);
 (Continued)

(58) Field of Classification Search
 CPC ........ B01D 69/10; B01D 69/12; B01D 53/22; B01D 71/70; B01D 53/228;
 (Continued)

(56) References Cited

U.S. PATENT DOCUMENTS

| 4,602,922 A | * | 7/1986 | Cabasso | B01D 69/12 427/245 |
| 4,748,288 A | * | 5/1988 | Bitter | B01D 61/022 208/308 |

(Continued)

FOREIGN PATENT DOCUMENTS

| CN | 102008909 A | 4/2011 |
| WO | 2014/059132 A2 | 4/2014 |

OTHER PUBLICATIONS

Rao et al., "Gas Separation Properties of Siloxane/Polydimethylsiloxane Hybrid Membrane Containing Fluorine", Separation and Purification Technology, 2011, 78, 132-137, Elsevier B.V.
(Continued)

*Primary Examiner* — Anthony R Shumate
(74) *Attorney, Agent, or Firm* — Dinsmore & Shohl, LLP

(57) ABSTRACT

Composite membranes include a polymer material that is selectively permeable to heavy ($C_{3+}$) hydrocarbons over methane. The polymer material may be a modified poly (dimethylsilane) having a backbone including dimethylsiloxyl monomers, substituted methylsiloxyl monomers, and internal-network monomers. The substituted methylsiloxyl monomers may include phenylmethylsiloxyl monomers or $C_5$-$C_{10}$ alkylmethylsiloxyl monomers such as octylmethylsiloxyl monomers. The polymer material may include silicon-alkyl linkages such as Si—$(CH_2)_n$—Si, where n≥2 that may create a structure that imparts desirable permeability and selectivity characteristics to the composite membrane. The polymer material may be cast onto a porous support material. The composite membranes may be incorporated into systems or methods for removing heavy hydrocarbons from natural gas.

43 Claims, 21 Drawing Sheets

(51) Int. Cl.
  *B01D 69/12* (2006.01)
  *B01D 69/10* (2006.01)
  *C10L 3/10* (2006.01)
  *B01D 69/02* (2006.01)

(52) U.S. Cl.
  CPC ........... *B01D 69/125* (2013.01); *B01D 71/70* (2013.01); *C10L 3/101* (2013.01); *B01D 2053/221* (2013.01); *B01D 2256/245* (2013.01); *B01D 2257/702* (2013.01); *B01D 2323/12* (2013.01); *B01D 2323/30* (2013.01); *C10L 2290/548* (2013.01)

(58) Field of Classification Search
  CPC ..... B01D 2053/221; C10L 3/10; C10L 3/101; C10L 2290/548
  See application file for complete search history.

(56) References Cited

U.S. PATENT DOCUMENTS

| | | | | |
|---|---|---|---|---|
| 4,933,082 | A * | 6/1990 | Yamada | B01D 69/12 210/500.38 |
| 2008/0149561 | A1 * | 6/2008 | Chu | A61L 15/425 210/500.38 |
| 2009/0078640 | A1 * | 3/2009 | Chu | B01D 67/0013 210/321.6 |
| 2012/0297976 | A1 * | 11/2012 | Sano | B01D 53/22 95/47 |
| 2016/0184779 | A1 | 6/2016 | Iizuka et al. | |
| 2017/0157570 | A1 * | 6/2017 | Chu | B01D 69/12 |
| 2017/0326505 | A1 * | 11/2017 | Deemer | B01D 71/021 |
| 2018/0133644 | A1 * | 5/2018 | Liu | B01D 53/228 |

OTHER PUBLICATIONS

Reddy et al., "Prospects of Siloxane Membrane Technology for Gas Separation—A Review", Journal of Scientific & Industrial Research, 2003, 62, 666-677.

Scholes et al., "Membrane Gas Separation Applications in Natural Gas Processing" Fuel, 2012, 96, 15-28, Elsevier Ltd.

Schultz et al., "Membranes for Separation of Higher Hydrocarbons from Methane", Journal of Membrane Science, 1996, 110, 37-45, Elsevier Science B.V.

Stern et al., "Structure-Permeability Relationships in Silicone Polymers", Journal of Polymer Science: Part B: Polymer Physics, 1987, 25, 1263-1298, John Wiley & Sons, Inc.

International Search Report and Written Opinion dated May 4, 2018 pertaining to International Application No. PCT/US2018/017189, filed Feb. 7, 2018, 21 pages.

Rao, et al., Preparation and oxygen/nitrogen permeability of PDMS crosslinked membrane and PDMS/tetraethoxysilicone hybrid membrane, Journal of Membrane Science, Elsevier BV, vol. 303, No. 1-2, Sep. 4, 2007, pp. 132-139, The Netherlands.

Esteves, et al., Influence of cross-linker concentration on the cross-linking of PDMS and the network structures formed, Polymer 50, Elsevier Science Publishers BV, vol. 50, No. 16, Jul. 31, 2009, pp. 3955-3966, Great Britain.

Stafie et al., Effect of PDMS cross-linking degree on the permeation performance of PAN/PDMS composite nanofiltration membranes, Separation and Purification Technology, Elsevier Science, vol. 45, No. 3, Oct. 15, 2005, pp. 220-231, The Netherlands.

* cited by examiner

MODIFIED SILOXANE COMPOSITE MEMBRANES FOR HEAVY HYDROCARBON RECOVERY

BACKGROUND

Field

The present specification generally relates to polymeric separation membranes and to systems and methods incorporating the polymeric separation membranes, more particularly to modified polysiloxane membranes for separating heavy hydrocarbons from natural gas, to systems incorporating the polysiloxane membranes, and to methods of separating heavy hydrocarbons using the polysiloxane membranes.

Technical Background

Raw natural gas is often saturated with heavy hydrocarbons that need to be separated before the natural gas can be piped. Heavy hydrocarbons generally include hydrocarbons having at least three carbon atoms such as propane ($C_3H_8$), butane ($C_4H_{10}$), and other heavy and condensable hydrocarbons. The current separation technology of choice is a sequence of cooling and condensation, or absorption. The removal of heavy hydrocarbons is currently a sizeable market for membranes in natural gas processing, after acidic gas removal, and will hold this position for the foreseeable future. Accordingly, there are ongoing needs for separation membrane materials for commercial recovery of heavy hydrocarbons. Such membrane materials should exhibit increased permeability toward the heavy hydrocarbons and selectivity to the heavy hydrocarbons over light hydrocarbons such as methane.

SUMMARY

According to some embodiments of this disclosure, composite membranes include a polymer material that is selectively permeable to heavy hydrocarbons having three or more carbon atoms over methane. The polymer material includes a first copolymer having a polysiloxane backbone according to formula (I):

$$M\text{-}O\text{-}(A^1)_d\text{-}(A^2)_p\text{-}(A^3)_m\text{-}M \qquad (I)$$

In formula (I), each $A^1$ is a dimethylsiloxyl monomer; each $A^2$ is substituted methylsiloxyl monomer; and each $A^3$ is an internal-network monomer. The substituted methylsiloxyl monomers $A^2$ may be substituted with an alkyl or a phenyl. The internal network monomers $A^3$ include methylsiloxyl monomers substituted with a group that connects the silicon atom of the methylsiloxyl monomer with another silicon atom through an alkyl linkage. In some examples, the alkyl linkage may include a chain of at least two carbon atoms, whereby a linkage Si—$(CH_2)_n$—Si is formed, where $n \geq 2$. The presence of the alkyl linkages in the polymer material may increase permeability of the composite membranes to the heavy hydrocarbons and increase the selectivity of the composite membranes to heavy hydrocarbons over light hydrocarbons such as methane. Subscripts d, p, and m in formula (I) represent molar fractions of randomly arranged monomers $A^1$, $A^2$, and $A^3$ in the polysiloxane backbone. Subscript p is from 0 to 0.50 or from 0.20 to 0.50; subscript m is from 0.01 to 0.20; and $d+p+m \leq 1$. Each M in formula (I) is a terminal silyl group. In some embodiments, the composite membrane may include a layer of the polymer material cast onto a porous support material such as a microporous support.

According to further embodiments, systems for removing heavy hydrocarbons from natural gas may include a composite membrane having the polysiloxane backbone of formula (I). The systems may include a separator unit comprising an inlet, a retentate outlet, and a permeate outlet; and a source of natural gas in fluidic communication with the inlet of the separator unit. The composite membrane may be configured within the separator unit to prevent a flow of fluids from the inlet to the permeate outlet without first passing through the composite membrane and to permit the flow of fluids to proceed from the inlet to the retentate outlet without passing through the composite membrane. The systems further include a retentate collector in fluidic communication with the retentate outlet of the separator unit; and a permeate collector in fluidic communication with the permeate outlet of the separator unit.

According to further embodiments, methods for removing heavy hydrocarbons from a natural gas stream include a composite membrane according to formula (I) to separate the heavy hydrocarbons from the natural gas stream. The natural gas stream may contain methane and an initial volume fraction of the heavy hydrocarbons. In particular, the methods may include introducing the natural gas stream at a feed pressure into a separator unit having an inlet, a retentate outlet, a permeate outlet, and at least one composite membrane. The composite membrane may be configured within the separator unit to prevent a flow of fluids from the inlet to the permeate outlet without first passing through the composite membrane and to permit the flow of fluids to proceed from the inlet to the retentate outlet without passing through the composite membrane. The methods further include collecting at least one of a retentate from the retentate outlet or a permeate from the permeate outlet. The retentate may have a reduced volume fraction of the heavy hydrocarbons, the reduced volume fraction being less than the initial volume fraction. The permeate may have an increased volume fraction of the heavy hydrocarbons, the increased volume fraction being greater than the initial volume fraction.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
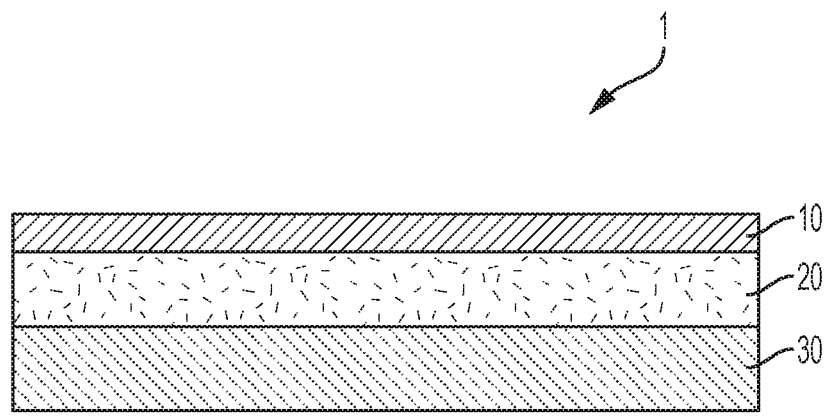
FIG. 1 is a cross sectional schematic diagram of a composite membrane according to embodiments.

Polymeric membranes are the most common membranes used in gas separation processes. Gas transport through a dense non-porous membrane follows a solution-diffusion mechanism. Glassy polymers are in general diffusivity selective, and preferentially permeate smaller, less condensable gases such as hydrogen ($H_2$), nitrogen ($N_2$), and methane ($CH_4$), while rubbery polymers preferentially permeate larger, more condensable gases such as propane and butane. Poly(dimethylsiloxane) (PDMS) has received considerable attention and long utilization industrially as a special membrane material for the separation of natural gas. However, PDMS rubbery membrane materials tend to have poor selectivity to heavy hydrocarbons in a mixture of gases. Among other siloxane rubbery materials, poly(octylmethyl siloxane) (POMS) is a derivative of the PDMS, in which some of the methyl-groups have been substituted by octyl side chains. POMS membranes show better $C_4H_{10}/CH_4$ mixed gas selectivity ($C_4H_{10}/CH_4=12$) than PDMS ($C_4H_{10}/CH_4=4$). However, the permeability decreases with increasing feed pressure, owing to membrane compression at increased feed pressure. Therefore, separation membrane materials for commercial recovery of heavy hydrocarbons are particularly desired that have greater permeability to heavy hydrocarbons and greater selectivity to heavy hydrocarbons over light hydrocarbons.

According to embodiments of this disclosure, composite membranes for separating heavy hydrocarbons from natural gas include polymer materials having functionality and crosslinking structures that are believed to impart higher permeability to heavy carbons and higher selectivity to heavy hydrocarbons over lighter components of natural gas than is commonly realized in poly(dimethylsiloxane) (PDMS) rubbery membranes. The polymer materials of the composite membranes are prepared using chemical reactions such as an addition reaction between silicon-hydrogen (Si—H) bonds and vinyl groups, a grafting of a second polysiloxane copolymer to the backbone of the polymer material, a hydrolysis, and a polycondensation of trimethylalkoxysiloxane polymers and silanol functional polymers. The polymer materials include side-chain modifications such as bulky groups on a PDMS backbone.

The side-chain modifications include forming within the polymer material an inter-connected, crosslinked internal network having multiple linkages of the general structure Si—$(CH_2)_n$—Si, where n is at least 2, that are believed contribute to an increase of hydrocarbon solubility of the composite membranes compared to PDMS. Non-limiting examples of such linkages include linkages for which n is 2, 3, or greater than 3. In this disclosure, the term "Si—C—C—Si linkage" refers to a linkage of the structure Si—$(CH_2)_n$—Si where n is 2 and the term "Si—C—C—C—Si linkage" refers to a linkage of the structure Si—$(CH_2)_n$—Si where n is 3. The permeation performance of the functionalized and crosslinked siloxane composite membranes can be controlled by chemically modifying the side-chain constituents of the copolymer material or by adjusting parameters of processes for coating the copolymer material onto a microporous support.

In general, polymer membranes separate components of a gas or vapor mixture because the components permeate the membrane at different rates. The permeability, P, of a polymer membrane material for a gas is the rate at which that gas moves through a standard thickness (1 cm) of the membrane under a standard driving force (a pressure difference of 1 cmHg). A measure of the ability of a membrane to separate two gases is the selectivity, α, defined as the ratio of the gas permeabilities, $P_1/P_2$. Both high permeability and high selectivity are desirable characteristics of polymer membranes for separation, because a higher permeability decreases the size of membrane necessary to treat a given amount of gas, while higher selectivity results in a more highly purified product. The composite membranes according to embodiments have permeability and selectivity characteristics for use in separation of heavy hydrocarbons or of liquefied petroleum gases (LPG) from natural gas.

Accordingly, reference will now be made in detail to embodiments of composite membranes that include a polymer material that is selectively permeable to heavy hydrocarbons having three or more carbon atoms over small-molecule components of natural gas such as methane, nitrogen, hydrogen, and carbon dioxide, for example. Embodiments of systems incorporating the composite membranes for separating heavy hydrocarbons from natural gas, and methods for separating heavy hydrocarbons from natural gas using a system incorporating the composite membranes, will be disclosed subsequently.

The term "selectively permeable" means that the heavy hydrocarbons having three or more carbon atoms are capable of permeating the polymer material and that the heavy hydrocarbons have a greater permeability through the polymer material than do the small-molecule components of natural gas.

Referring to FIG. 1, a composite membrane 1 according to embodiments includes a polymer material 10. In some embodiments, the polymer material 10 may be a freestanding membrane having suitable mechanical characteristics for use of the polymer material 10 in a separation system. In other embodiments, the polymer material may be supported on a porous support layer 20 to provide additional mechanical suitability for use of the composite membrane 1 in a separation system. The polymer material 10 may be coated onto the porous support layer 20 by conventional techniques such as casting or spin coating of a separation layer solution containing dissolved polymer, then drying and heat treating the dried polymer to crosslink the polymer material 10. Examples of materials for use as a porous support layer 20 include, but are not limited to polyacrylonitriles, poly(vinylidene fluorides), polycarbonates, polyamides, cellulose acetates, polymer sulfones, polyether ketones, polyetherether ketones, or polyether sulfones. The material of the porous support layer 20 may be a microporous polymer or copolymer. In some embodiments, additional mechanical stability may be imparted to the composite membrane 1 by a base support 30. Suitable materials for the base support 30 may include nonwoven materials such as, but not limited to, poly(ethylene terephthalate), cellulose acetates, polyethylene, polypropylene, poly(alkylamides), or poly(aryl amides). Thus, in some embodiments, the composite membrane 1 may include the polymer material 10, the base support 30 that provides structural support to the polymer material 10, and the porous support layer 20 is interposed between the polymer material 10 and the base support 30.

In illustrative embodiments, a polymer material 10 supported on a porous support layer 20 may have a thickness sufficient to block small-molecule components of the natural gas while permitting heavy hydrocarbons to permeate the polymer material 10. For example, the polymer material 10 may have a thickness from 0.2 μm to about 100 μm, such as from 1 μm to 5 μm. The porous support layer 20 may have a thickness sufficient to remain physically intact when coated with the polymer material 10. For example, the porous support layer 20 may have a thickness from 10 μm to 100 μm or from 30 μm to 60 μm. A base support 30, when present, may have a thickness sufficient to impart the required mechanical support to the porous support layer 20 coated with the polymer material 10. For example, the base support 30 may have a thickness from 100 μm to 250 μm. Other dimensions such as length, width, and shape or geometry of the composite membrane 1 as a whole may vary according to a desired end use and are limited only by customary constraints of operational feasibility and mechanical stability. The porous support layer 20 may be microporous. Examples of microporous supports include flat sheets of a microporous material and supports formed from hollow fibers.

The polymer material 10 of the composite membrane according to embodiments includes a first copolymer having a polysiloxane backbone. In some embodiments that will be described subsequently in greater detail, the polymer material 10 may include one or more second copolymers having polysiloxane backbones that are joined to the first copolymer by molecular linkages formed by grafting, by crosslinking, or by other chemical techniques for building membranes having multiple polysiloxane backbones.

The first copolymer of the polymer material 10 will now be described. It should be understood that in all representations of chemical structures in this disclosure, a wavy line drawn perpendicularly to a bond denotes a connection point of the chemical structure with another chemical structure or functional group and implies that the bond broken by the wavy line extends to another atom not shown in the representation. Furthermore, it should be understood that in all representations of chemical structures in this disclosure, a wavy line drawn in place of a bond denotes a bond that is not part of the definition of the chemical structure so represented but that exists in a crosslinked material as a bond joining two molecules of discrete copolymers. Appurtenant to the meaning of the wavy line in place of a bond is the term "crosslinking site." The term "crosslinking site" refers to a location where a first polymer molecule of a depicted structure crosslinks to a second polymer molecule that may be chemically the same or different from the first polymer molecule. The use of "crosslinking site" to refer to a location is to be distinguished from any implied reference to an atom or a chemical group. Though the identity of an atom at a crosslinking site may be implied by the identity of atoms joined to the crosslinking site, the atom of the second polymer molecule expected to be present at the "crosslinking site" is not intended to be considered part of the first polymer molecule.

The first copolymer of the polymer material 10 may have a polysiloxane backbone according to the general formula (I):

Thus, the first copolymer according to formula (I) includes monomers of three particular types: $A^1$, $A^2$, and $A^3$, each of which will be described in turn. The subscripts d, p, and m, of formula (I) denote fractions of monomers in the polymer backbone of formula (I), based on the total number of monomers in the polymer backbone. In some embodiments, the sum of subscripts d, p, and m is one, meaning that the polymer backbone consists of monomer units according to $A^1$, $A^2$, and $A^3$. In other embodiments, the sum of subscripts d, p, and m may be less than one, meaning that the polymer backbone may include other monomers in addition to monomers $A^1$, $A^2$, and $A^3$.

Each monomer $A^1$ of the polymer material 10 is a dimethylsiloxyl monomer, and each $A^2$ and $A^3$ is a monomer other than dimethylsiloxyl. Thus, the polymer backbone of formula (I) may be characterized in some embodiments as a modified PDMS backbone.

Each monomer $A^2$ of the polymer material 10 is independently chosen from substituted methylsiloxyl monomers having formula (M1):

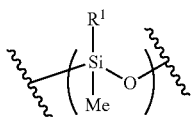

(M1)

In formula (M1), each $R^1$ is independently chosen from a $C_5$-$C_{10}$ alkyl or phenyl. In some embodiments, each $R^1$ is a $C_5$-$C_{10}$ alkyl. In other embodiments, each $R^1$ is phenyl. In other embodiments, the monomer units $A^2$ in the polysiloxane backbone according to formula (I) include some monomers for which $R^1$ is a $C_5$-$C_{10}$ alkyl and other monomers for which $R^1$ is phenyl. Examples of $C_5$-$C_{10}$ alkyl groups include linear or branched or cyclic, saturated or unsaturated, optionally functionalized hydrocarbon radicals having from 5 to 10 carbon atoms in their primary chains, exclusive of any carbon atoms that may be present on a functional group, the radical being formed by removing one hydrogen atom from a carbon atom of the primary chain so that the group is free to bond with a different chemical moiety. In specific examples, the $C_5$-$C_{10}$ alkyl groups may be chosen from n-pentyl, n-hexyl, n-heptyl, n-octyl, n-nonyl, n-decyl, or any isomers of the normal, straight-chained alkyls. In some embodiments, all groups $R^1$ of the polymer material 10 may be the same. In some embodiments, all groups $R^1$ of the polymer material 10 may be n-octyl.

As used throughout this disclosure, the terms "independently chosen from" or "independently selected from" means that for multiple instances of a variable group in a particular chemical structure or moiety, the identity of each individual instance does not depend on the identity of any other individual instance, subject only to any exceptions or provisos that are explicitly stated. Thus, three groups A, B, and C that are independently selected from X, Y, or Z, may all be the same, all be different, or two of the groups may be the same while the third group is different from the other two. Furthermore, clauses such as "A is a member of a class and chosen from X, Y, or Z" and "A is a member of a class and selected from X, Y, or Z" mean that at least one A of the applicable class is X, Y, or Z but do not foreclose the possibility that another A of the same class may be something other than X, Y, or Z. For example, "A is an alkyl chosen from methyl or ethyl" means that at least one A is methyl or ethyl, but some different A may be an alkyl other than methyl or ethyl, such as propyl. In contrast, the language "A is a member of a class and is selected from the group consisting of X, Y, Z" is a closed group, where every A is X, Y, or Z, and no A is anything other than X, Y, or Z.

Each monomer $A^3$ of the polymer material 10 is independently chosen from internal-network monomers having formula (M2):

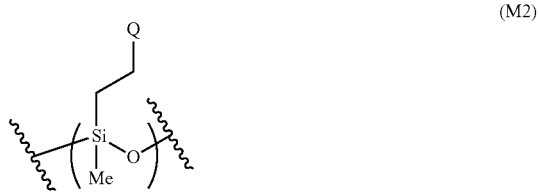

(M2)

Internal-network monomers are so named because each such monomer includes an alkylene linkage between two silicon atoms with no intervening oxygen atoms. Thus, the internal-network monomers may include, for example, an alkylene linkage such as Si—C—C—Si or Si—C—C—C—Si.

The alkylene linkages between two silicon atoms are realized from the silicon atom of the monomer $A^3$, the —$CH_2CH_2$— linkage between the silicon atom of the monomer $A^3$ and the group Q, and a silicon atom of group Q bonded directly to the —$CH_2CH_2$— linkage. In formula (M2), each Q is independently chosen from —$Si(R^2)_3$, —$Si(OR^2)_3$, $R^3$, $R^4$, $Z^1$, $R^5$, or a group —$(CH_2)_z$—$R^5$, where z is an integer from 1 to 10.

Each $R^2$ of the polymer backbone of formula (I) is independently a $C_1$-$C_{20}$ alkyl such as, for example, a $C_1$-$C_{15}$ alkyl, a $C_1$-$C_{10}$ alkyl, a $C_1$-$C_5$ alkyl, n-butyl, 1,1-dimethylethyl (tert-butyl), n-propyl, 1-methylethyl (isopropyl), ethyl, or methyl. Thus, when group Q of formula (M2) is —$Si(R^2)_3$, Q is a trialkylsilyl group having a silicon atom bonded directly to the alkylene linkage of the monomer $A^3$. Similarly, when group Q of formula (M2) is —$Si(OR^2)_3$, Q is a trialkoxysilyl group having a silicon atom bonded directly to the alkylene linkage.

Each $R^3$ of the polymer backbone of formula (I) is chosen independently from structures having formula (Q1):

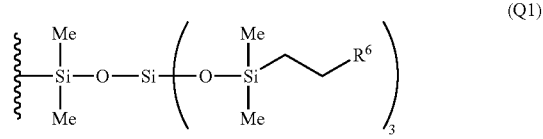

(Q1)

In formula (Q1), each $R^6$ is $R^4$ or $R^5$. Of the three groups $R^6$ in the formula (Q1), at least one $R^6$ is $R^4$. In some embodiments, of the three groups $R^6$ in the formula (Q1), exactly one $R^6$ is $R^4$ and the remaining two groups $R^6$ are $R^5$. Group $R^3$ includes a silicon atom that is directly bonded to the alkylene linkage of the monomer $A^3$.

Each $R^4$ in formula (I), whether present as a group Q or as a component of group $R^3$ (specifically, as group $R^6$) according to formula (Q1), is chosen independently from T-unit siloxane structures (so named because a silicon atom of the structure is directly bonded to exactly three oxygen atoms) having formula (Q2) or a linear siloxane unit having formula (Q3):

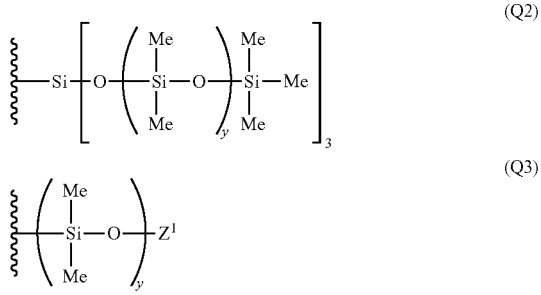

According to embodiments, in formula (Q2) and formula (Q3), each y is an integer from 1 to 850, from 1 to 500, from 1 to 100, from 1 to 50, from 1 to 40, from 1 to 30, from 1 to 20, from 1 to 10, or from 1 to 5. In some embodiments, each of the three instances of subscript y in formula (Q2) is the same integer from 1 to 50, from 1 to 40, from 1 to 30, from 1 to 20, from 1 to 10, or from 1 to 5. When Q is a group $R^4$, the group $R^4$ includes a silicon atom that is directly bonded to the alkylene linkage of the monomer $A^3$.

Each $R^5$ in formula (I) is a crosslinking group having formula (X1):

It should be evident that when Q is a group $R^5$ or a group $-(CH_2)_z-R^5$, the group Q includes a silicon atom that is directly bonded to the alkylene linkage of the monomer $A^3$. When Q is a group $-(CH_2)_z-R^5$, z may be an integer from 1 to 10, such as from 1 to 8, from 1 to 5, from 1 to 3, from 1 to 2, or z may be 1. When Q is a group $-(CH_2)_z-R^5$, the alkylene linkage to the silicon atom of monomer $A^3$ is lengthened by z carbon atoms, compared to a group $R^5$.

Each $Z^1$ in formula (I), whether present as a group Q or within a group $R^4$ or $R^5$, is a crosslinking site to a second copolymer having a polysiloxane backbone. The term "crosslinking site" and the meaning of the wavy bonds in formula (X1) were described previously.

As previously described, subscripts d, p, and m represent molar fractions of randomly arranged monomers $A^1$, $A^2$, and $A^3$, respectively, in the polysiloxane backbone. According to some embodiments, d is from 0.30 to 0.99, whereby from 30% to 99% of the monomer units in the polymer backbone are dimethylsiloxane units.

In some embodiments, subscript p, representing substituted methylsiloxane monomers in the polysiloxane backbone of the polymer material 10 may be from 0 to 0.50, such as from 0 to 0.45, 0.10 to 0.45, 0.25 to 0.40, or 0.30 to 0.40, for example, or any value or subset of ranges subsumed within or overlapping the range 0 to 0.50. In some embodiments, if p is zero, at least one monomer $A^3$ of the polymer material includes a group Q that is $-(CH_2)_z-R^5$. In further embodiments, if no monomer $A^3$ of the polymer material includes a group Q that is $-(CH_2)_z-R^5$, p is from 0.20 to 0.50, from 0.30 to 0.50, or from 0.35 to 0.40.

In some embodiment, subscript m, representing internal-network monomers in the polysiloxane backbone of the polymer material 10 may be from 0.01 to 0.20, such as from 0.01 to 0.15, from 0.01 to 0.10, from 0.01 to 0.07, from 0.01 to 0.05, from 0.02 to 0.05, or from 0.03 to 0.05.

Each M of formula (I) is a terminal silyl group, namely, a silyl group in which a silicon atom is directly bonded to exactly one oxygen atom that is part of the polysiloxane backbone. In some embodiments, each M of formula (I) is trimethylsiloxyl.

In some embodiments, such as when a group Q is $Z^1$, for example the polymer material of the composite membrane includes at least two copolymers having a polysiloxane backbone. In some embodiments, the polymer material of the composite membrane includes at least one internal-network monomer $A^3$ in which group Q is $Z^1$, a crosslinking site to a second copolymer. The second copolymer may have a polysiloxane backbone according to formula (II):

In formula (II), each $G^1$ is independently chosen from substituted methylsiloxyl monomers having formula (G1):

In formula (G1), $R^7$ is chosen from hydrogen, $C_1$-$C_{10}$ alkyl or $C_6$-$C_{10}$ aryl. Examples of group $R^7$ that are $C_1$-$C_{10}$ alkyl include straight or branched or cyclic, saturated or unsaturated, substituted or unsubstituted alkyl radicals such as methyl, ethyl, propyl, butyl, pentyl, hexyl, heptyl, octyl, nonyl, or decyl, any of which may be a normal, straight chain, or a branched isomer. Further examples of group $R^7$ that are $C_1$-$C_{10}$ alkyl include cyclopentyl, cyclohexyl, cycloheptyl, and cyclooctyl, benzyl ($-CH_2$-phenyl) and substituted forms of these such as 4-methylcyclohexyl. Non-limiting example of substituted $C_1$-$C_{10}$ alkyl radicals include $\omega,\omega,\omega$-trifluoroalk-1-yls such as trifluoromethyl; 2,2,2-trifluoroeth-1-yl; 3,3,3-trifluoroprop-1-yl; 4,4,4-trifluorobut-1-yl, 5,5,5-trifluoropent-1-yl; and 6,6,6-trifluorohex-1-yl. Non-limiting examples of group $R^7$ that are $C_6$-$C_{10}$ aryl include phenyl, substituted phenyl, naphthyl, substituted napythyl. In illustrative embodiments, group $R^7$ is chosen from methyl, octyl, phenyl, or 3,3,3-trifluoroprop-1-yl. In some embodiments, each group $R^7$ in the second copolymer is identical to all other groups $R^7$. In other embodiments, groups $R^7$ in the second copolymer are independently selected from all other groups $R^7$.

In formula (II), each $G^2$ is independently chosen from internal-network monomers having formula (G2):

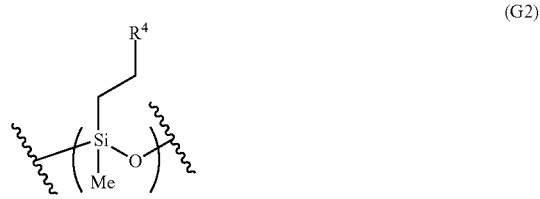

As with the internal-network monomers of the first copolymer, the internal-network monomers of the second copolymer include an alkylene linkage between two silicon atoms with no intervening oxygen atoms. Specifically, the internal-network monomers according to formula (G2) include an alkylene linkage Si—C—C—Si. In formula (G2), the group $R^4$ is defined as $R^4$ is defined in formula (I). Namely, each $R^4$ in formula (G2) is chosen independently from T-unit siloxane structures having formula (Q2) or linear polysiloxane structures having formula (Q3):

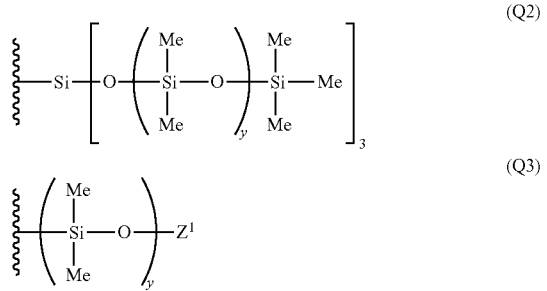

As previously described, in formulas (Q2) and (Q3), each y is an integer from 1 to 850, from 1 to 500, from 1 to 100, from 1 to 50, from 1 to 40, from 1 to 30, from 1 to 20, from 1 to 10, or from 1 to 5. In some embodiments, each of the three instances of subscript y in formula (Q2) is the same integer from 1 to 50, from 1 to 40, from 1 to 30, from 1 to 20, from 1 to 10, or from 1 to 5. The group $R^4$ includes a silicon atom that is directly bonded to the alkylene linkage of the monomer $G^1$.

In formula (II), each L is a linking monomer having formula (G3):

In formula (G3), $Z^2$ is a crosslinking site either to the first copolymer or to an additional copolymer. The additional copolymer may be another molecule of the first copolymer or of the second copolymer. For at least one linking monomer L of the second copolymer of formula (II), the $Z^2$ is a crosslinking site to the first copolymer. For example, the $Z^2$ that is the crosslinking site to the first copolymer may be equivalent to the crosslinking site $Z^1$ of the first copolymer, such that a $Z^1$ of the first copolymer represents the same position of the polymer material as the $Z^2$ of the second copolymer.

In formula (II), the subscripts n, b, and q represent molar fractions of randomly arranged monomers of the second copolymer, based on the number of monomers in the second copolymer. In illustrative embodiments, the fraction (n) of substituted methylsiloxane monomers of formula (G1) may be from 0.01 to 0.99. In illustrative embodiments, the fraction (q) of internal-network monomers having formula (G2) may be from 0 to 0.5, from 0.001 to 0.5, from 0.05 to 0.5, or from 0.1 to 0.5. In illustrative embodiments, the fraction (b) of linking monomers having formula (G3) may be from 0.01 to 0.5. In some embodiments, the second copolymer may have only monomers of $G^1$ of formula (G1), $G^2$ of formula (G2), and L of formula (G3), such that n+b+q=1 or such that q=1−(n+b). In example embodiments, n may be from 0.09 to 0.98, from 0.2 to 0.9, from 0.4 to 0.9, from 0.6 to 0.9, from 0.8 to 0.9, or from 0.90 to 0.98. In example embodiments, b may be from 0.55 to 0.94, from 0.55 to 0.80, from 0.55 to 0.65, from 0.65 to 0.94, from 0.75 to 0.94, or from 0.85 to 0.94. In example embodiments, q may be from 0 to 0.05, or from 0.001 to 0.05, or from 0.005 to 0.05, or from 0.01 to 0.05, or from 0.03 to 0.05.

As in formula (I), each M of formula (II) is a terminal silyl group. In some embodiments of polymer materials having two or more copolymers, each M of formula (II) is trimethylsilyl.

Specific non-limiting embodiments of composite membranes will now be described, in which the polymer material of the composite membrane is a material shown in any of FIGS. 4-8.

Figure 4:
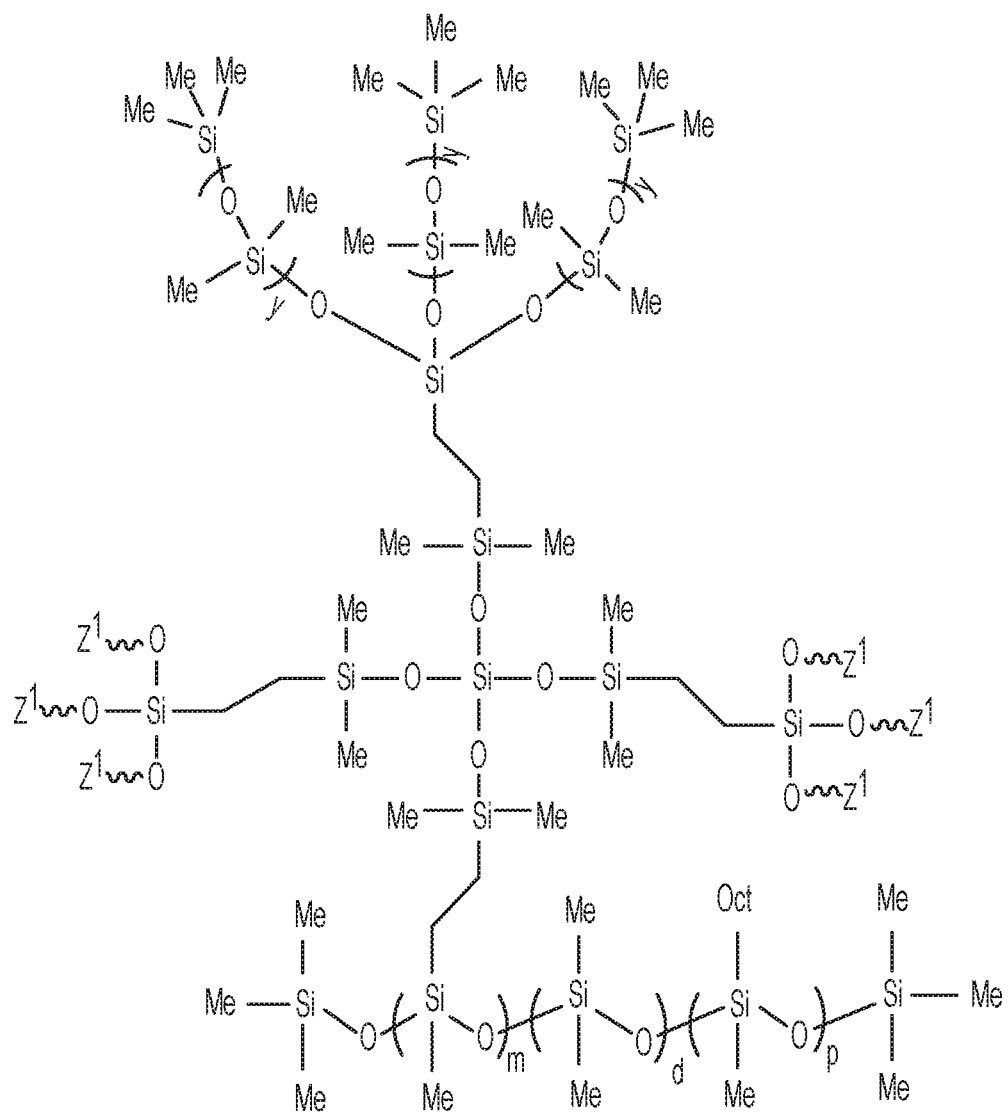
FIG. 4 is an illustrative chemical structure of certain polymer materials of composite membranes according to embodiments.

In some embodiments, the composite membrane may include the polymer material of FIG. 4. The polymer material of FIG. 4 has formula (I), in which p is from 0.20 to 0.50; each $R^1$ is octyl (Oct); each Q is $R^3$, as previously defined; d and m are as previously defined; and each $Z^1$ is a crosslinking site to another molecule of the polymer material of FIG. 4.

Figure 5:
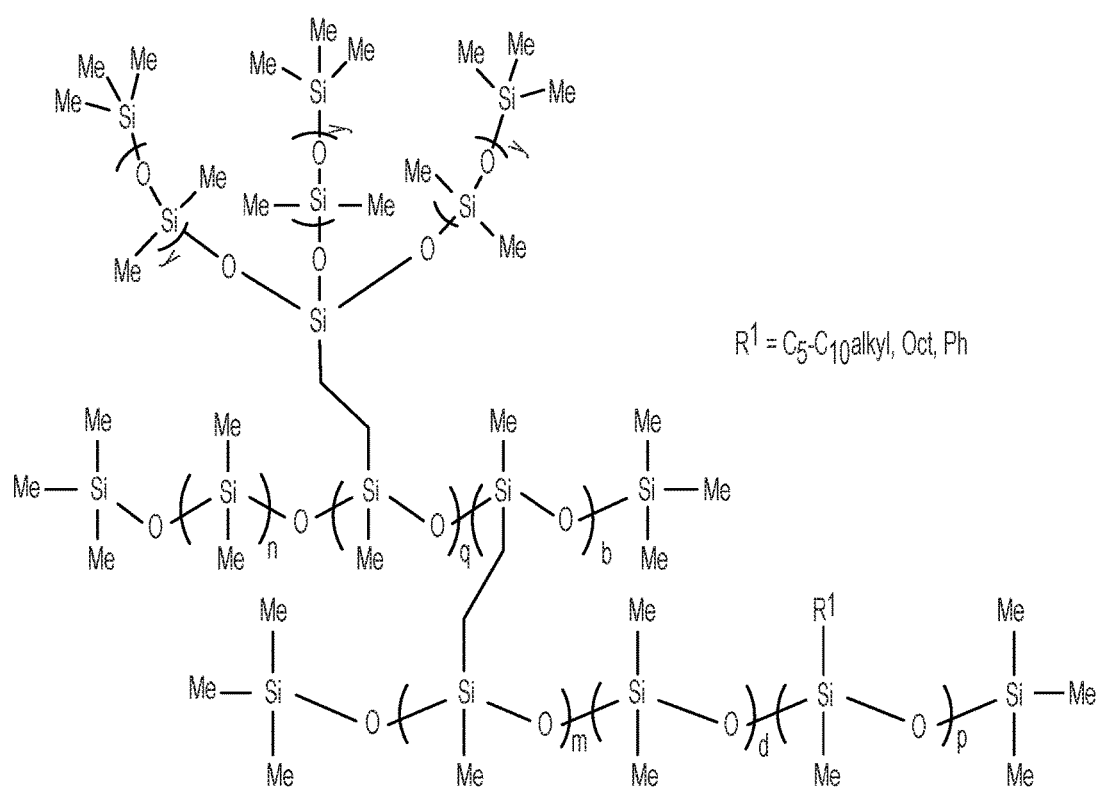
FIG. 5 is an illustrative chemical structure of certain polymer materials of composite membranes according to embodiments.

In some embodiments, the composite membrane may include the polymer material of FIG. 5. The polymer material of FIG. 5 has formula (I), in which p is from 0.20 to 0.50; each $R^1$ is a straight or branched $C_5$-$C_{10}$ alkyl, a straight chained normal octyl group (Oct), or a $C_6$-$C_{10}$ aryl group such as phenyl; and each Q is a crosslinking site $Z^1$ to a second copolymer having a polysiloxane backbone according to formula (II) as previously defined. In the second copolymer, each $G^1$ is a dimethylsiloxyl monomer (each $R^7$ of each monomer $G^1$ is methyl) and each $G^2$ is independently chosen from internal-network monomers having formula (G2):

In formula (G2), $R^4$ is as defined in formula (I), namely, a T-structured polysiloxane according to formula (Q2). In the second copolymer of the polymer material of FIG. 5, at least one monomer L is a linking monomer having formula (G3), in which $Z^2$ is the crosslinking site $Z^1$ of the first copolymer. Thus, the first copolymer and the second copolymer are linked through at least one alkylene linkage Si—C—C—Si. Subscripts m, d, n, q, b, and y have values within a range previously defined, m+d+p=1, n+b+q=1, and each M is trimethylsilyl.

Figure 6:
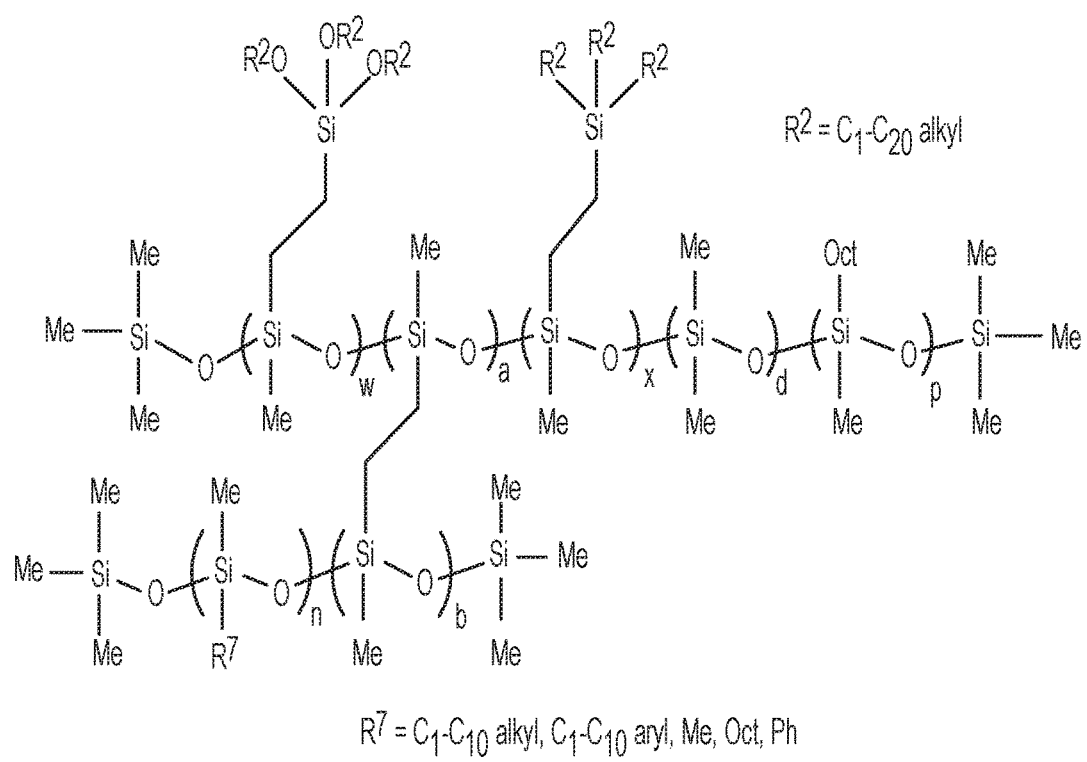
FIG. 6 is an illustrative chemical structure of certain polymer materials of composite membranes according to embodiments.

In some embodiments, the composite membrane may include the polymer material of FIG. 6. The polymer material of FIG. 6 has formula (I), in which p is from 0.20 to 0.50 and each $R^1$ of the substituted methylsiloxane monomers $A^2$ is octyl (Oct). The internal-network monomers $A^3$ of the polymer material of FIG. 6 are any combination of monomers selected from the group consisting of (1) alkylsilyl monomers according to formula (M2) in which Q is —Si($R^2$)$_3$, where $R^2$ is $C_1$-$C_{20}$ alkyl; (2) alkoxysilyl monomers according to formula (M2) in which Q is —Si(OR$^2$)$_3$, where $R^2$ is $C_1$-$C_{20}$ alkyl; (3) crosslinking monomers according to formula (M2) in which Q is a crosslinking site $Z^1$ to a second copolymer having a polysiloxane backbone according to formula (II) as previously defined, in which each $G^1$ is independently chosen from substituted methylsiloxyl monomers having formula (G1) as previously defined, where $R^7$ is chosen from $C_1$-$C_{10}$ alkyl or $C_6$-$C_{10}$ aryl; each L is a linking monomer having formula (G3), as previously defined, where $Z^2$ is the crosslinking site $Z^1$ of the first copolymer; b is from 0.00003 to 0.99, from 0.05 to 0.99, or from 0.01 to 0.5; q is 0; n+b+q=1; and each M is a terminal siloxyl group. Specific to the polymer material of FIG. 6, the subscript n of formula (I) equals the sum w+a+x, where subscript a is the fraction of monomers that are crosslinking monomers according to formula (M2) in which Q is a crosslinking site $Z^1$ to a second copolymer having a polysiloxane backbone according to formula (II); subscript x is the fraction of monomers that are alkylsilyl monomers according to formula (M2) in which Q is —$Si(R^2)_3$; and subscript w is the fraction of monomers that are in which Q is —$Si(OR^2)_3$.

In embodiments for which the polymer material is the material of FIG. 6, any of subscripts w, a, or x may be zero, provided w+a+x is greater than zero. In some embodiments, the internal-network monomers $A^3$ of the polymer material of FIG. 6 include at least one crosslinking monomer. In such embodiments, subscript a is necessarily greater than zero and subscripts w and x may be zero or nonzero. In further embodiments, the internal-network monomers $A^3$ of the polymer material of FIG. 6 include at least one alkylsilyl monomer, at least one alkoxysilyl monomer, and at least one crosslinking monomer. In such embodiments, all subscripts w, a, and x are greater than zero.

In non-limiting example embodiments, each $R^7$ of the polymer material of FIG. 6 may be selected from the group consisting of methyl, ethyl, propyl, butyl, pentyl, hexyl, heptyl, octyl, nonyl, and phenyl. In some embodiments, each $R^7$ of the polymer material of FIG. 6 is methyl. In some embodiments, each $R^7$ of the polymer material of FIG. 6 is octyl. In some embodiments, each $R^7$ of the polymer material of FIG. 6 is phenyl.

Figure 7:
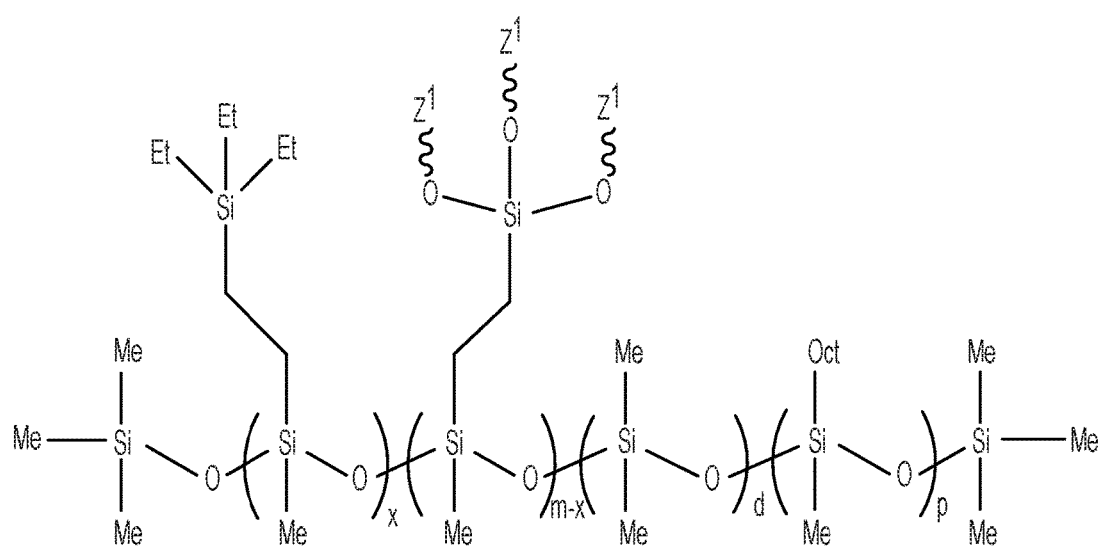
FIG. 7 is an illustrative chemical structure of certain polymer materials of composite membranes according to embodiments.

In some embodiments, the composite membrane may include the polymer material of FIG. 7. The polymer material of FIG. 7 has formula (I), in which p is from 0.20 to 0.50; d and m within respective ranges previously defined; each $R^1$ of the substituted methylsiloxane monomers $A^2$ is octyl (Oct); each Q of the internal-network monomers $A^3$ is independently chosen from —$Si(R^2)_3$ or $R^5$, where $R^2$ is $C_1$-$C_{20}$ alkyl and $R^5$ is a crosslinking group having formula (X1) as previously defined; and each $Z^1$ is a crosslinking site to another copolymer molecule, for example to another molecule of a copolymer according to FIG. 7. Though in the specific embodiment of FIG. 7 each $R^2$ is ethyl (Et), it should be understood that each $R^2$ may be chosen from any $C_1$-$C_{20}$ alkyl as previously defined. In some embodiments, in the polymer material of FIG. 7, the internal-network monomers $A^3$ are selected from the group consisting of alkylsilyl monomers according to formula (M2) in which Q is —$Si(R^2)_3$; crosslinking monomers according to formula (M2) in which Q is $R^5$; and combinations thereof.

The subscript x, which represents a mole fraction of internal-network monomers that are alkylsilyl monomers in the polymer material of FIG. 7, may be zero or nonzero. The subscript m of the polymer material of FIG. 7 must be greater than zero, and accordingly the subscript x must be less than subscript m. According to some embodiments, the composite membrane may include a polymer material according to formula (I), in which internal-network monomers $A^3$ include at least one alkylsilyl monomer according to formula (M2) in which Q is —$Si(R^2)_3$; and at least one crosslinking monomer according to formula (M2) in which Q is $R^5$. An example of such embodiments includes the polymer material of FIG. 7, in which subscript x and subscript m are both greater than zero and m is greater than x.

Figure 8:
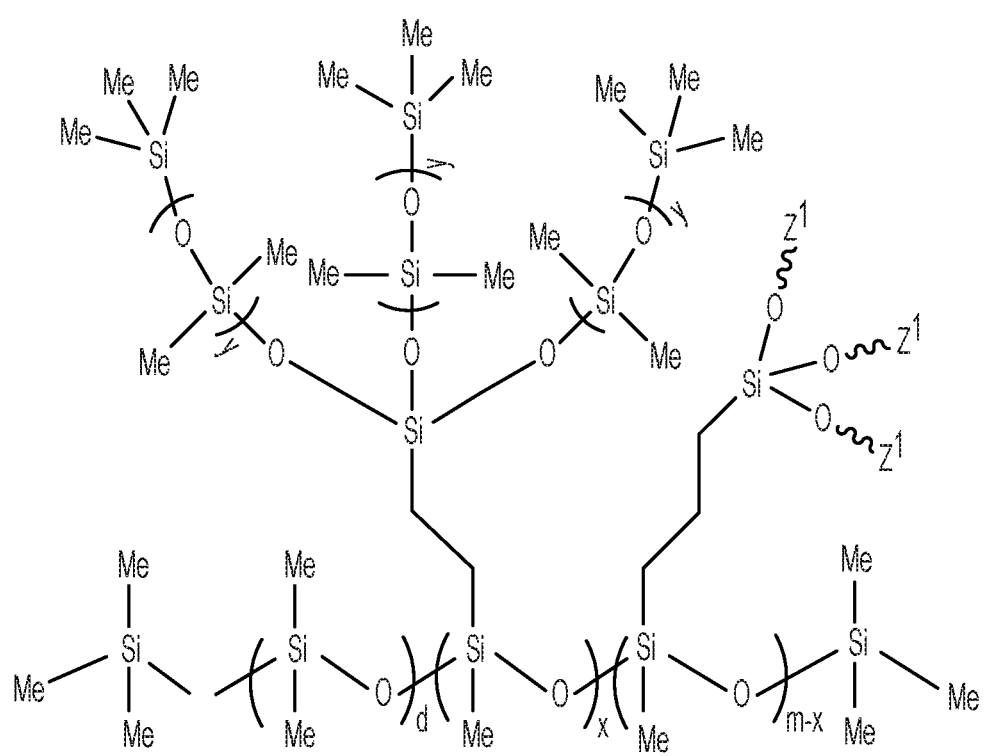
FIG. 8 is an illustrative chemical structure of certain polymer materials of composite membranes according to embodiments.

In some embodiments, the composite membrane may include the polymer material of FIG. 8. The polymer material of FIG. 8 has formula (I), in which the internal-network monomers $A^3$ include or are selected from the group consisting of monomers according to formula (M2) in which Q is $R^3$; crosslinking monomers according to formula (M2) in which Q is —$(CH_2)_z$—$R^5$, where $R^5$ is a crosslinking group having formula (X1) as previously defined, and where z is from 1 to 10; and combinations thereof. Specifically, the material of FIG. 8 is a polymer material according to formula (I), in which subscript p is 0. The subscript x, which represents a mole fraction of internal-network monomers in the polymer material of FIG. 8 that are according to formula (M2) in which Q is $R^3$, may be zero or nonzero. The subscript m of the polymer material of FIG. 8, which represents crosslinking monomers according to formula (M2) in which Q is —$(CH_2)_z$—$R^5$, must be greater than zero, and accordingly the subscript x must be less than subscript m. In the specific embodiment of FIG. 8, in the crosslinking monomers according to formula (M2), each Q is —$(CH_2)_z$—$R^5$, where subscript z is 1. Each $Z^1$ in FIG. 8 is a crosslinking site at an end of a group $R^5$ to another copolymer molecule, for example to another molecule of a copolymer according to FIG. 8.

The subscript x in the copolymer of FIG. 8, which represents a mole fraction of internal-network monomers for which Q is $R^3$, may be zero or nonzero. The subscript m of the polymer material of FIG. 8 must be greater than zero, and accordingly the subscript x must be less than subscript m. According to some embodiments, the composite membrane may include a polymer material according to formula (I), in which internal-network monomers $A^3$ include at least one crosslinking monomer according to formula (M2) in which Q is —$(CH_2)_z$—$R^5$. According to some embodiments, the composite membrane may include a polymer material according to formula (I), in which internal-network monomers $A^3$ include both at least one crosslinking monomer according to formula (M2) in which Q is —$(CH_2)_z$—$R^5$ and at least one crosslinking monomer according to formula (M2) in which Q is $R^3$. An example of such embodiments includes the polymer material of FIG. 8, in which subscript x and subscript m are both greater than zero and m is greater than x. According to some embodiments, the composite membrane may include a polymer material according to formula (I), in which internal-network monomers include at least one monomer according to formula (M2) in which Q is $R^3$; and at least one crosslinking monomer according to formula (M2) in which Q is —$(CH_2)_z$—$R^5$, where z is 1.

Figure 19:
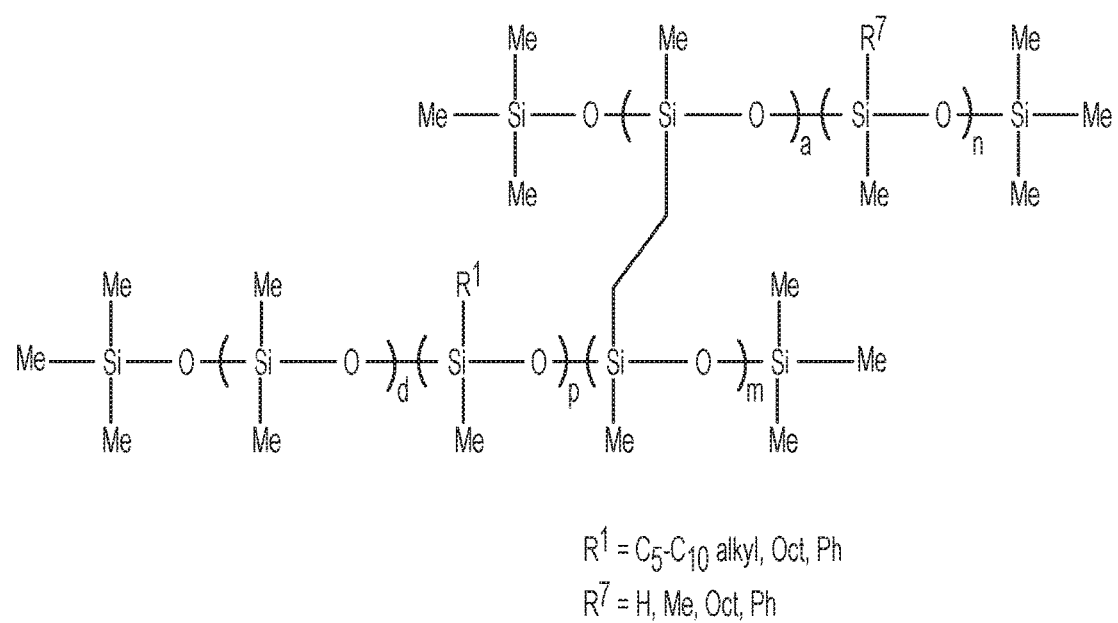
FIG. 19 is an illustrative chemical structure of certain polymer materials of composite membranes according to embodiments.

In some embodiments, the composite membrane material may include a polymer material of FIG. 19. The polymer material of FIG. 19 has formula (I), in which the substituted methylsiloxyl monomers $A^2$ according to formula (M1) may have a group $R^1$ that is $C_5$-$C_{10}$ alkyl, octyl, or phenyl. The groups $R^1$ in a single polymer material according to FIG. 19 may all be the same, or some groups $R^1$ may differ from other groups $R^1$. The internal-network monomers $A^3$ of the polymer material of FIG. 19 have formula (M2), where Q is a group $Z^1$, namely, a crosslinking site to a second copolymer of formula (II) having a polysiloxane backbone of $R^7$-substituted methylsiloxane monomers of formula (G1) and linking monomers L of formula (G3) that link the backbone of the second copolymer to the first copolymer.

Groups $R^7$ may be hydrogen, $C_1$-$C_{10}$ alkyl (such as, for example, methyl or octyl), or $C_6$-$C_{10}$ aryl (such as phenyl, for example). The groups $R^7$ in a single polymer material according to FIG. 19 may all be the same, or some groups $R^7$ may differ from other groups $R^7$.

In some embodiments the polymer material of FIG. 19, the subscript p may be from 0.20 to 0.50; the subscript m may be from 0.01 to 0.20; and d+p+m may be less than or equal to 1. In the second copolymer of the polymer material of FIG. 19, the subscript n may be generally from 0.005 to 0.55. The subscript "a" may equal 1-n and, therefore, may be generally from 0.45 to 0.995. In an example embodiment of a polymer material according to FIG. 19, all groups $R^7$ are hydrogen. In a further example embodiment of a polymer material according to FIG. 19, all groups $R^7$ are methyl. In a further example embodiment of a polymer material according to FIG. 19, all groups $R^7$ are octyl; subscript n is from 0.25 to 0.30; and subscript a is from 0.70 to 0.75. In a further example embodiment of a polymer material according to FIG. 19, all groups $R^7$ are phenyl; subscript n is from 0.45 to 0.50; and subscript a is from 0.50 to 0.55.

Figure 20:
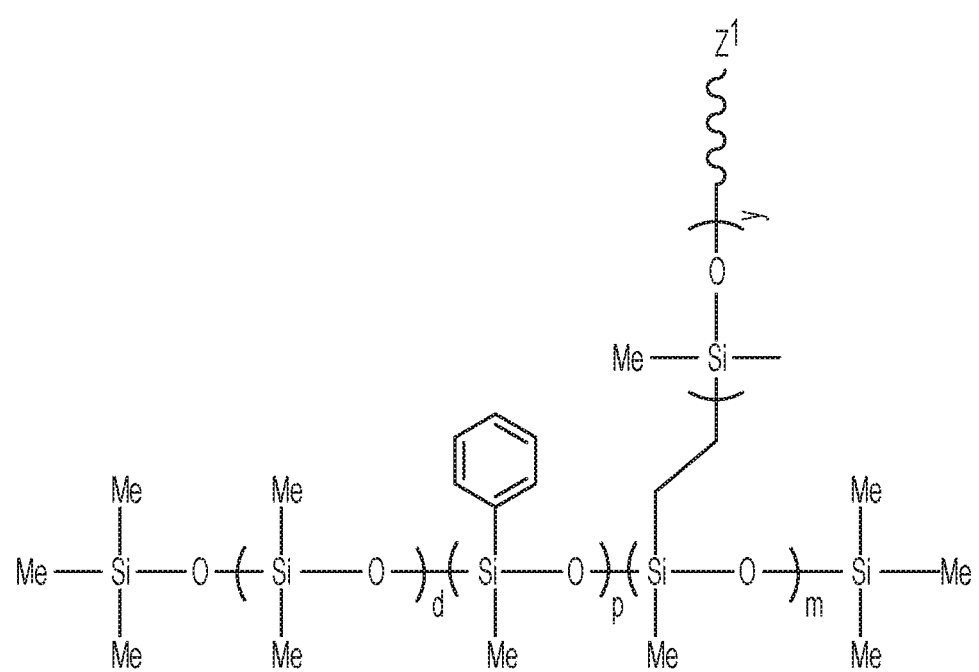
FIG. 20 is an illustrative chemical structure of certain polymer materials of composite membranes according to embodiments.

In some embodiments, the composite membrane material may include a polymer material of FIG. 20. The polymer material of FIG. 20 has formula (I), in which the substituted methylsiloxyl monomers $A^2$ are phenylmethylsiloxyl monomers according to formula (M1), where each group $R^1$ is phenyl. The internal-network monomers $A^3$ of the polymer material according to FIG. 20 have formula (M2), where Q is a group $R^4$, particularly, a group according to formula (Q3), in which the subscript y is an integer from 1 to 850, from 1 to 500, from 1 to 100, from 1 to 50, from 1 to 40, from 1 to 30, from 1 to 20, from 1 to 10, or from 1 to 5. In some embodiments the polymer material of FIG. 20, the subscript p may be from 0.20 to 0.50; the subscript m may be from 0.01 to 0.20; and d+p+m may be less than or equal to 1.

Figure 3:
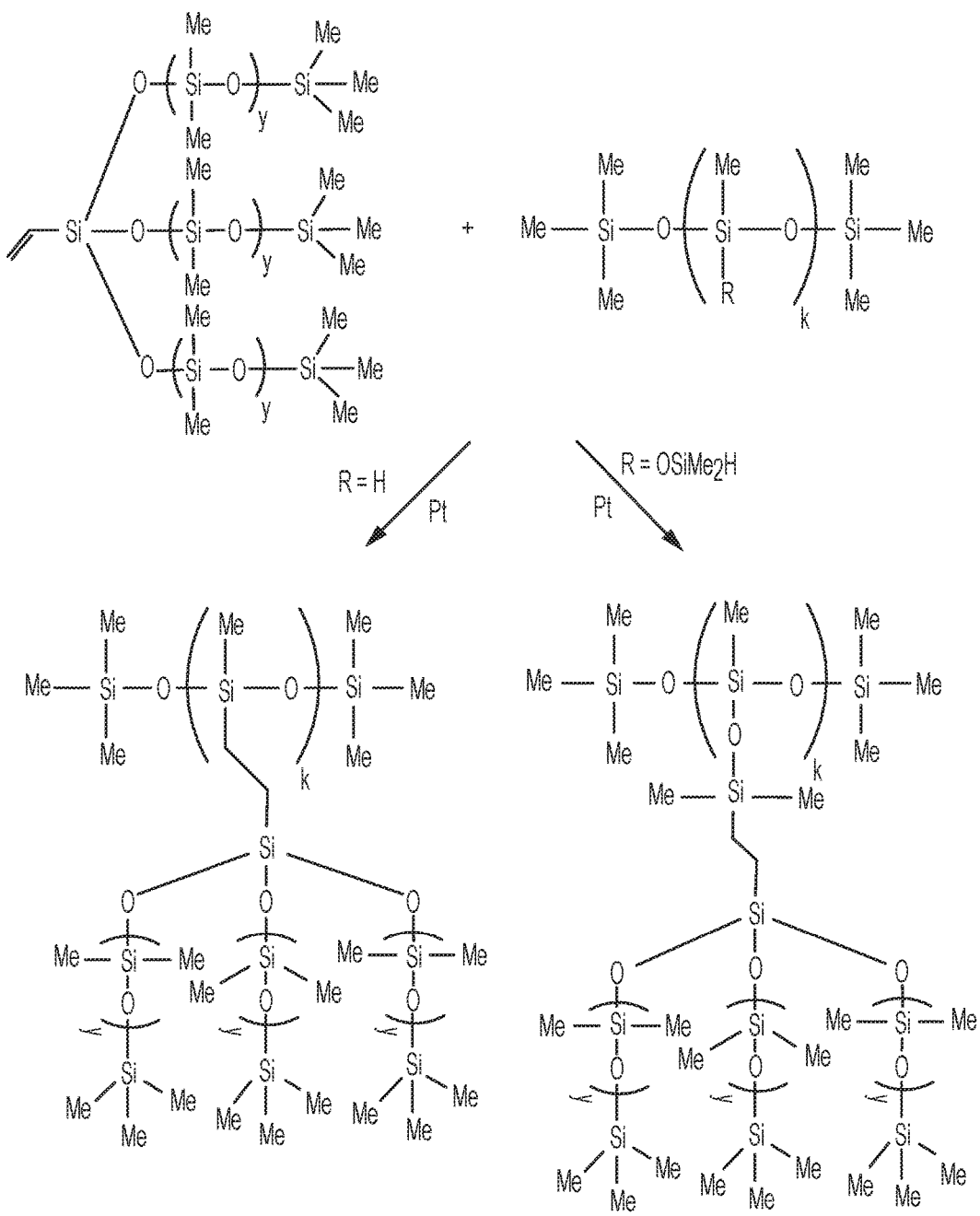
FIG. 3 is an illustrative scheme for a reaction between a vinyl T-structured polymer and a polymer including polymethylhydrosiloxane monomers to form a crosslinking agent for preparing polymer materials for composite membranes according to embodiments.

As will be further illustrated in the specific Examples of this disclosure, the polymer materials of the composite membrane according to embodiments may be prepared using various synthetic schemes. Referring to FIG. 3, a first synthetic scheme includes reaction of a molecule, such as a silane or a siloxane, that includes vinyl groups (for example, the vinyl-T structure polysiloxanes of FIG. 3) with a polymer having methylhydrosiloxane monomers, such that the backbone of the polymer having the methylhydrosiloxane monomers becomes the backbone of the first copolymer or the second copolymer of the polymer material. Under appropriate reaction conditions in the presence of an appropriate catalyst, the vinyl groups react with the hydrogen atoms of the methylhydrosiloxane monomers to form Si—C—C—Si alkylene linkages.

In some embodiments, the molecule having vinyl groups may be reacted with the polymer having methylhydrosiloxane monomers in a molar amount that leaves some methylhydrosiloxane monomers unreacted. Thus, the reaction product of the molecule including vinyl groups with the polymer having methylhydrosiloxane monomers may be used as a crosslinking agent. Such a crosslinking agent may be further reacted with a prepolymer molecule such as a vinylmethylsiloxane-alkylmethylsiloxane-dimethylsiloxane terpolymer such as, for example, a vinylmethylsiloxane-octylmethylsiloxane-dimethylsiloxane terpolymer. Further examples of prepolymer molecules include vinylmethylsiloxane-arylmethylsiloxane-dimethylsiloxane terpolymers such as, for example, vinylmethylsiloxane-phenylmethylsiloxane-dimethylsiloxane terpolymers. The unreacted methylhydrosiloxane monomers of the crosslinking agent then react with the vinyl groups of the terpolymers to form a crosslinked copolymer having two copolymer backbones linked through Si—C—C—Si alkylene linkages. The first reaction scheme may be followed to prepare the polymer materials of FIGS. 4 and 5, as further described in Examples 1 and 2.

In a second reaction scheme, a prepolymer molecule such as a vinylmethylsiloxane-alkylmethylsiloxane-dimethylsiloxane terpolymer or, for example, a vinylmethylsiloxane-octylmethylsiloxane-dimethylsiloxane terpolymer, may be modified by reacting the prepolymer with any functionalized silane such as, for example, a trialkoxysilane and optionally a trialkylsilane in addition to the trialkoxysilane, to form a crosslinkable prepolymer. Thereby, the silanes react with the vinylmethylsiloxane monomers to form side group functionalities linked to a polymer backbone through Si—C—C—Si alkylene linkages. The silanes are reacted at a molar amount such that some of the vinylmethylsiloxane monomers remain unreacted. The reaction product may then be reacted with a crosslinking agent, such as a copolymer that includes methylhydrosiloxane monomers. Thereby, the unreacted vinylmethylsiloxane monomers of the crosslinkable polymer react with the methylhydrosiloxane monomers to form a polymer material having two polymer backbones linked through one or more Si—C—C—Si alkylene linkages. The second reaction scheme may be followed to prepare the polymer materials of FIG. 6, as further described in Examples 3-5.

In a third reaction scheme, a prepolymer molecule such as a vinylmethylsiloxane-alkylmethylsiloxane-dimethylsiloxane terpolymer or, for example, a vinylmethylsiloxane-octylmethylsiloxane-dimethylsiloxane terpolymer, may be modified by reacting the prepolymer with any functionalized silane such as, for example, a trialkoxysilane and optionally a trialkylsilane in addition to the trialkoxysilane, to form a modified prepolymer. Thereby, the silanes react with the vinylmethylsiloxane monomers to form side group functionalities linked to a polymer backbone through Si—C—C—Si alkylene linkages. The trialkoxysilane side groups of the modified prepolymer may then be hydrolyzed to trihydroxysilane side groups to form a crosslinkable copolymer. The crosslinkable copolymer may then be crosslinked by a mild heat treatment in the presence of an appropriate catalyst, so that the trihydroxysilane side groups crosslink to other molecules of the crosslinkable copolymer. The third reaction scheme may be followed to prepare the polymer materials of FIG. 7, as further described in Example 6.

In a fourth synthetic scheme, a first molecule including vinyl groups (for example, the vinyl-T structure polysiloxanes of FIG. 3) and an alkyltrialkoxysilane, in which the alkyl group is a terminal olefin, is reacted with a polymer having methylhydrosiloxane monomers. Non-limiting of alkyltrialkoxysilanes include vinyltrialkoxysilanes and allyltrialkoxysilanes. Under appropriate reaction conditions in the presence of an appropriate catalyst, the vinyl groups of the first molecule and the alkyltrialkoxysilane react with the hydrogen atoms of the methylhydrosiloxane monomers to form side groups having Si—C—C—Si alkylene linkages to the copolymer backbone. Then, the side groups resulting from the alkyltrialkoxysilane may be hydrolyzed to form a crosslinkable copolymer having alkyltrihydroxsilyl side groups. The crosslinkable copolymer may then be crosslinked by a mild heat treatment in the presence of an appropriate catalyst, so that the trihydroxysilane side groups crosslink to other molecules of the crosslinkable copolymer.

The fourth reaction scheme may be followed to prepare the polymer materials of FIG. 8, as further described in Example 7.

The composite membranes according to various embodiments may be prepared by casting a separation layer solution containing any of the polymer materials previously described, dissolved in an appropriate solvent such as chloroform or hexane, for example, onto a polymer support. Suitable polymer supports include microporous supports such as, for example, polyacrylonitrile, polyvinylidene fluoride, or polyether sulfone. The polymer materials as cast may be dried and further subjected to a mild heat treatment to fully crosslink the membrane on the polymer support. The resulting functionalized and crosslinked siloxane composite membranes may then be incorporated into a gas-separation system or used to separate heavy hydrocarbons from natural gas. Composite membranes including the polymer materials previously described exhibit enhanced permeance to heavy hydrocarbons and enhanced selectivity of heavy hydrocarbons over gases such as methane, carbon dioxide, oxygen, and nitrogen.

Thus, various embodiments of composite membranes have been described. Embodiments of systems for removing heavy hydrocarbons from natural gas will now be described. The systems may include one or more than one composite membrane according to any of the embodiments previously described.

Figure 2:
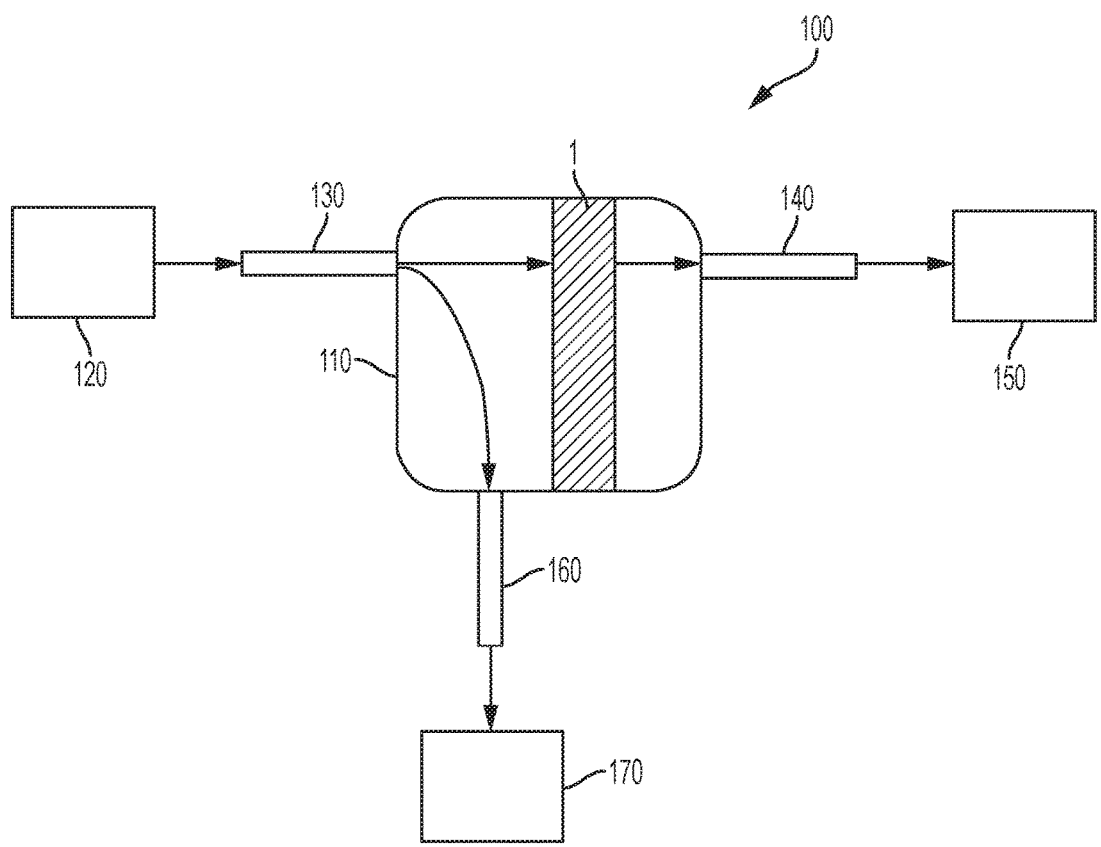
FIG. 2 is a schematic of a system for removing heavy hydrocarbons from natural gas, according to embodiments, including a composite membrane, according to embodiments.

Referring to the schematic diagram of FIG. 2, a system 100 for removing heavy hydrocarbons from natural gas may include a separator unit 110 having comprising an inlet 130, a retentate outlet 160, and a permeate outlet 140. A natural-gas source 120 may be connected in fluidic communication with the inlet 130 of the separator unit 110, such that a fluid (liquid, gas, or vapor) may flow freely between the natural-gas source 120 and the inlet 130. The system 100 further includes at least one composite membrane 1 according to any embodiment of this disclosure, configured within the separator unit 110 to prevent a flow of fluids from the inlet 130 to the permeate outlet 140 without first passing through the at least one composite membrane 1 and to permit the flow of fluids to proceed from the inlet 130 to the retentate outlet 160 without passing through the at least one composite membrane 1.

The system 100 may further include a retentate collector 170 in fluidic communication with the retentate outlet 160 of the separator unit 110. The system 100 may further include a permeate collector 150 in fluidic communication with the permeate outlet 140 of the separator unit 110. In such a system 100 including the at least one composite membrane 1, fluids that reach the permeate collector 150 are enriched in heavy hydrocarbons, relative to the fluids that initially reach the separator unit 110 from the natural gas source 120 through the inlet 130. Likewise, fluids that reach the retentate collector 170 have a decreased fraction of heavy hydrocarbons, relative to the fluids that initially reach the separator unit 110 from the natural gas source 120 through the inlet 130. In some embodiments, the permeate collector 150 collects a permeate containing heavy hydrocarbons having at least three carbon atoms.

In some embodiments not shown, the system 100 for removing heavy hydrocarbons from natural gas may include multiple separator units each having at least one composite membrane according to embodiments of this disclosure. In other embodiments not shown, the separator unit 110 or multiple separator units may include more than one composite membrane, each of which may include a polymer material that is the same as or different from that of any other composite membrane in an individual separator unit or in another separator unit of the system.

In some embodiments, the composite membrane of the system includes a polymer material according to formula (I) as previously defined, in which subscript p is from 0.20 to 0.50. In some embodiments, the composite membrane of the system includes a polymer material according to formula (I) as previously defined, in which each $R^1$ of the polymer material is octyl. In some embodiments, the polymer material of the composite membrane is coated onto a porous support layer, and the porous support later is interposed between the polymer material and the nonwoven material. In some such embodiments, the nonwoven material may be poly(ethylene terephthalate) and the porous support layer may be chosen from polyacrylonitrile, poly(vinylidene fluoride), or polyether sulfone.

It should be understood that the schematic of FIG. 2 is intended to illustrate only a basic configuration of the system 100 and omits conventional equipment such as compressors, valves, heaters or coolers, fans, circulators, control apparatus, pressure sensors, or the like, which may be implemented in a large-scale system. It should be understood further that many configurations for separator units exist and that the configuration shown is not intended to be limiting. For example, the separator unit may be configured such that the incoming fluid through the inlet enters parallel to the composite membrane. Further, a carrier gas may be introduced into the separator unit on the side of the composite membrane opposite the inlet, as a means to facilitate removal of permeate fluids. In such configurations, the carrier gas and the incoming natural gas may flow through the separator unit in a co-flow (same direction) or a counterflow (opposite directions) pathway.

Embodiments of methods for removing heavy hydrocarbons from natural gas will now be described, with additional reference to FIG. 2. In some embodiments, methods for removing heavy hydrocarbons, such as hydrocarbons having at least three carbon atoms, from a gas stream such as a natural gas stream containing methane and an initial volume fraction of the heavy hydrocarbons, may include introducing the natural gas stream at a feed pressure into a separator unit 110 comprising an inlet 130, a retentate outlet 160, a permeate outlet 140, and at least one composite membrane 1 according to any embodiment of this disclosure. The at least one composite membrane 1 may be configured within the separator unit 110 to prevent a flow of fluids from the inlet 130 to the permeate outlet 140 without first passing through the at least one composite membrane 1 and to permit the flow of fluids to proceed from the inlet 130 to the retentate outlet 160 without passing through the at least one composite membrane 1. The methods may further include collecting at least one of (1) a retentate from the retentate outlet 160, the retentate having a reduced volume fraction of the heavy hydrocarbons, the reduced volume fraction being less than the initial volume fraction; or (2) a permeate from the permeate outlet 140, the permeate having an increased volume fraction of the heavy hydrocarbons, the increased volume fraction being greater than the initial volume fraction. The methods may include establishing a feed pressure to the natural gas source 120. Examples of a suitable feed pressure may include from 1 bar to 10 bar. The methods may include establishing a separation temperature of the separator unit 110. Examples of suitable separation temperatures for separating heavy hydrocarbons from natural gas may include from 20° C. to 100° C.

EXAMPLES

The following examples illustrate one or more additional features of the present disclosure described previously. It should be understood that these examples are not intended to limit the scope of the disclosure or the appended claims in any manner.

In the following examples, composite membranes according to embodiments of this application were prepared by casting a separation layer solution containing a polymer material onto microporous polymer supports using conventional casting techniques such as application by a doctor blade, then drying the separation layer solution to remove residual solvents. Preparations of the polymer materials according to the structures in FIGS. 4-8, 19, and 20 are described in Examples 1-7 and 11-20. As bases for comparison, conventional composite membranes of poly(dimethylsiloxane) (PDMS) and poly(octylmethylsiloxane) (POMS) were prepared as described in Comparative Example 8. Membrane transport properties of the composite membrane of Example 2 are provided in Example 9; properties of the composite membrane of Example 6 are provided in Example 10; and properties of selected composite membranes of Examples 11-20 are provided in Example 21.

Example 1

Preparation of Composite Membrane 1

Composite Membrane 1 includes the polymer material of FIG. 4 on a microporous polymer support. The polymer material of FIG. 4 is prepared by first preparing a crosslinker agent, then reacting the crosslinker agent with a modified PDMS prepolymer, specifically a methyloctylvinyl terpolymer, to form a separation solution. The separation solution is then cast onto the microporous polymer support and cured.

To prepare the crosslinker agent, a silane such as tetrakis(dimethylsiloxyl)silane or 2,4,6,8-tetramethylcyclotetrasiloxane is dissolved in organic solvents such as chloroform or hexane with a vinyl T-structured polymer under vigorous mechanical stirring. The vinyl T-structured polymer has formula (E1), where the subscript y is an integer from 1 to 850, from 1 to 100, from 1 to 50, from 1 to 20, from 1 to 10, or from 1 to 5:

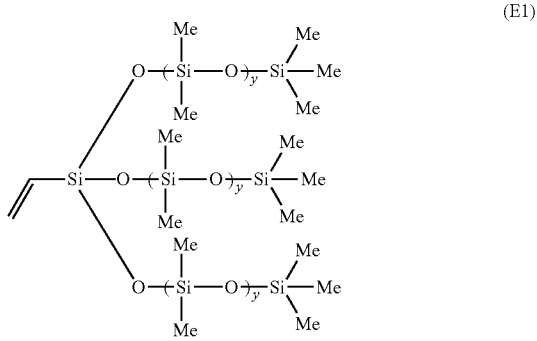

(E1)

A catalyst such as 1,3-diethenyl-1,1,3,3-tetramethyldisiloxane platinum complex is added into the mixed solution under nitrogen gas protection. The reaction is maintained for about 2 hours 25° C. and then for an additional 2 hours at 40° C. under mechanical stirring to yield a light yellow, transparent crosslinking agent having formula (E2):

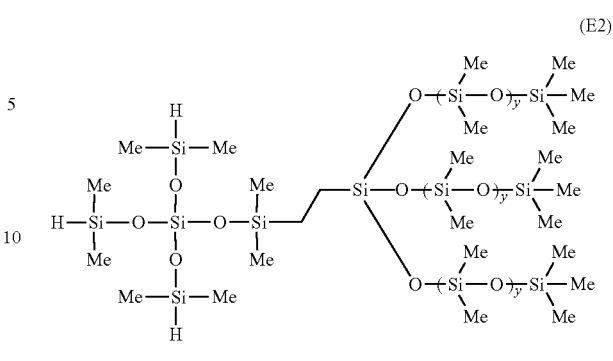

(E2)

The crosslinking agent is then reacted with a prepolymer to form a separation layer. The particular prepolymer is a methyl-terminated vinylmethylsiloxane-octylmethylsiloxane-dimethylsiloxane terpolymer having a molecular weight of 10,000 Dalton to 12,000 Dalton and containing 3% to 5% vinylmethylsiloxane monomers, based on the total number of monomers other than the terminal monomers. Thus, the prepolymer has formula (E3), where $R^1$ is octyl; p is from 0.35 to 0.40, m is from 0.03 to 0.05, and d+p+m=1:

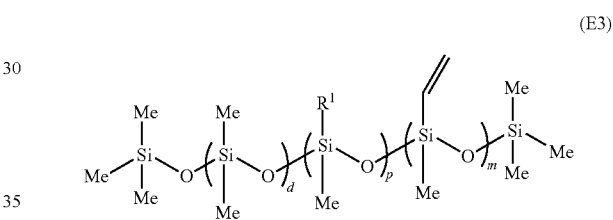

(E3)

To form a separation layer, the crosslinking agent and a prepolymer are dissolved in an organic solvent such as chloroform or hexane under mechanical stirring to form a homogeneous solution. A catalyst such as 1,3-diethenyl-1,1,3,3-tetramethyldisiloxane platinum complex is added slowly into the solution, followed by stirring for 5 minutes to 30 minutes at 25° C. The obtained solution is then degassed and prepared for coating.

The composite membrane is fabricated by casting the separation layer solution onto a microporous polymer support such as polyacrylonitrile (with molecular weight cut-off (MWCO) of 150 k), polyvinylidene fluoride (MWCO 75 k to 250 k), or polyether sulfone (MWCO 10 k to 20 k) at 25° C. The resulting composite membrane is dried at 25° C. overnight to remove solvent. The composite membrane is then crosslinked in an oven at 50° C. to 100° C. for 24 hours to 72 hours, particularly from 60° C. to 75° C. for about 48 hours.

Example 2

Preparation of Composite Membrane 2

Composite Membrane 2 includes the polymer material of FIG. 5, where $R^1$ is octyl, on a microporous polymer support. The polymer material of FIG. 5 where $R^1$ is octyl is prepared by the same method as described for Composite Membrane 1 in Example 1, except that the crosslinking agent is formed by reacting the vinyl T-structured polymer of formula (E1) with a methylhydrosiloxane-dimethylsiloxane copolymer according to formula (E4), where k is from 0.01 to 0.55, having a viscosity from 10 cP to 8,000 cP:

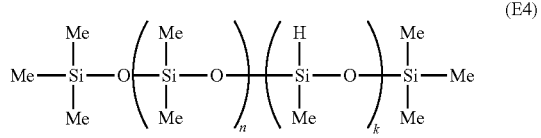
(E4)

In the reaction mixture of the vinyl T-structured polymer with the methylhydrosiloxane-dimethylsiloxane copolymer, the vinyl groups of the vinyl T-structured polymer replaces the hydrogen atoms of the methylhydrosiloxane monomers to form Si—C—C—Si linkages. To enable the crosslinking agent to be further polymerized with the vinylmethylsiloxane-octylmethylsiloxane-dimethylsiloxane terpolymer, the vinyl T-structured polymer is added to the initial reaction mixture with the methylhydrosiloxane-dimethylsiloxane copolymer in an amount that results in reaction of fewer than all methylhydrosiloxane monomers of the methylhydrosiloxane-dimethylsiloxane copolymer with the vinyl T-structured polymer. Thus, the crosslinking agent for preparing Composite Membrane 2 has formula (E5), where n is the same as in the methylhydrosiloxane-dimethylsiloxane copolymer of formula (E4), and b equals k of the copolymer of formula (E4) minus q.

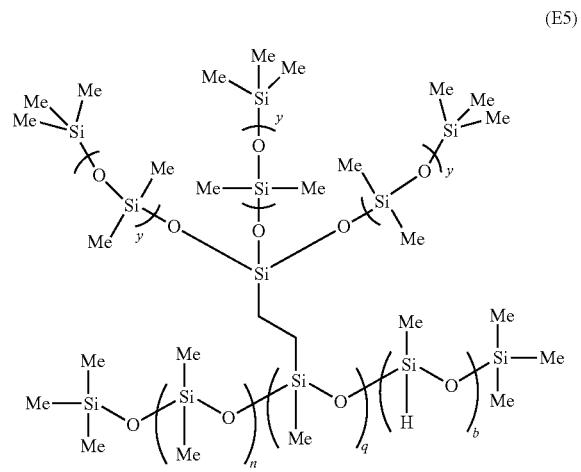
(E5)

The crosslinking agent is then reacted with the prepolymer vinylmethylsiloxane-octylmethylsiloxane-dimethylsiloxane terpolymer, as previously described in Example 1, to form a separation layer solution. The separation layer solution is then cast onto a microporous polymer support, dried, and crosslinked. In the final reaction that results in the polymer material of Composite Membrane 2 (FIG. 5, $R^1$=octyl), vinyl groups of the prepolymer react with the remaining hydrogen atoms of the methylhydrosiloxane monomers of the crosslinking agent to form additional Si—C—C—Si linkages.

Characterizations and comparative data with regard to a composite membrane prepared according to the foregoing procedure are provided in Example 9.

Example 3

Preparation of Composite Membrane 3

Composite Membrane 3 includes the polymer material of FIG. 6 on a microporous polymer support, specifically where $R^7$ is methyl, groups —$OR^2$ are methoxy, and groups $R^2$ bonded directly to silicon atoms are ethyl. The polymer material of Composite Membrane 3 is prepared by first modifying a prepolymer according to formula (E3) to incorporate additional functionalities including Si—C—C—Si units, then addition curing the modified prepolymer with a crosslinking agent.

To modify the prepolymer, a polymer according to formula (E3), where p is from 0.35 to 0.40 and m is from 0.03 to 0.05, is dissolved in an organic solvent such as chloroform or hexane under vigorous mechanical stirring. To the dissolved prepolymer solution, a trialkylsilane such as triethylsilane, a trialkoxysilane such as trimethoxysilane, or a combination of a trialkylsilane and a trialkoysilane, may be added at a molar amount that results in reaction of the silanes with fewer than all of the monomers of the prepolymer that have vinyl groups. For example, if the prepolymer includes 3% to 5% vinyl monomers based on the total number of monomers in the prepolymer, the silanes may be added at an amount that results in from 1% to 99% of the vinyl monomers being unreacted after the modification.

A catalyst such as 1,3-diethenyl-1,1,3,3-tetramethyldisiloxane platinum complex is added into the mixed solution under nitrogen gas protection. The reaction is maintained for about 2 hours 25° C. and then for an additional 2 hours at 40° C. under mechanical stirring to yield a modified prepolymer having formula (E6), where w and x are greater than or equal to zero, provided w+x is greater than zero; w+a+x equals m of the polymer according to formula (E3); and d and p are the same values as the corresponding values in the polymer according to formula (E3).

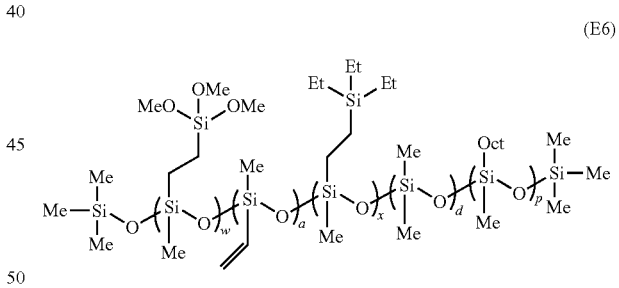
(E6)

A separation solution is then prepared by dissolving the modified prepolymer in an organic solvent such as chloroform or hexane under vigorous mechanical stirring and adding a crosslinking agent according to formula (E7), where $R^7$ is methyl, subscript n is from 0.01 to 0.99, and subscript b is from 0.01 to 0.55 or from 0.01 to 0.10 or from 0.01 to 0.05:

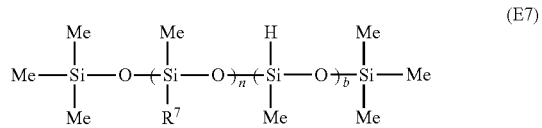
(E7)

The crosslinking agent may be added in an appropriate molar amount such that the number of available methylhydrosiloxane monomer units (subscript b) of the crosslinking agent in solution is equal to the number of unreacted methylvinylsiloxane monomer units (subscript a in formula (E6)) of the prepolymer in solution. The crosslinking agent may have a viscosity ranging from 25 cP to 8,000 cP. The solution containing the dissolved prepolymer and the dissolved crosslinking agent is stirred for about 5 minutes to 30 minutes at 25° C. then is degassed to prepare for coating. A catalyst such as 1,3-diethenyl-1,1,3,3-tetramethyldisiloxane platinum complex is added slowly into the solution, followed by stirring for 5 minutes to 30 minutes at 25° C. The obtained separation layer solution is then degassed and prepared for coating.

The separation layer solution is cast onto a microporous polymer support, dried, and crosslinked, as described in Example 1. In the final reaction that results in the polymer material of Composite Membrane 3, vinyl groups of the prepolymer react with the hydrogen atoms of the methylhydrosiloxane monomers of the crosslinking agent to form Si—C—C—Si linkages in addition to those formed from adding the functional groups to form the modified prepolymer.

Example 4

Preparation of Composite Membrane 4

Composite Membrane 4 includes the polymer material of FIG. 6 on a microporous polymer support, specifically where $R^7$ is octyl, where groups —$OR^2$ are methoxy, and where groups $R^2$ bonded directly to silicon atoms are ethyl. The polymer material and Composite Membrane 4 are prepared in a manner identical to that of Composite Membrane 3 described in Example 3, except that the crosslinking agent is a methylhydrosiloxane-octylmethylsiloxane copolymer according to formula (E7) where $R^7$ is octyl, where subscript n is from 0.01 to 0.99, and where subscript b is from 0.15 to 0.50, or from 0.20 to 0.40, or from 0.25 to 0.30. The crosslinking agent may have a viscosity of 30 cP to 60 cP.

Example 5

Preparation of Composite Membrane 5

Composite Membrane 5 includes the polymer material of FIG. 6 on a microporous polymer support, specifically where $R^7$ is phenyl, groups —$OR^2$ are methoxy, and groups $R^2$ bonded directly to silicon atoms are ethyl. The polymer material and Composite Membrane 5 are prepared in a manner identical to that of Composite Membrane 3 described in Example 3, except that the crosslinking agent is a methylhydrosiloxane-methylphenylsiloxane copolymer according to formula (E7) where $R^7$ is phenyl, subscript n is from 0.01 to 0.99, and subscript b is from 0.30 to 0.60 or from 0.40 to 0.55 or from 0.45 to 0.50. The crosslinking agent may have a viscosity of 75 cP to 110 cP.

Example 6

Preparation of Composite Membrane 6

Composite Membrane 6 includes the polymer material of FIG. 7 on a microporous polymer support. The polymer material of Composite Membrane 6 is prepared by first modifying a prepolymer according to formula (E3) to incorporate additional functionalities including Si—C—C—Si units having hydrolysable groups, then hydrolyzing and crosslinking the modified prepolymer without adding an additional crosslinking agent.

To modify the prepolymer, a polymer according to formula (E3), where p is from 0.35 to 0.40 and m is from 0.03 to 0.05, is dissolved in an organic solvent such as chloroform or hexane under vigorous mechanical stirring. To the dissolved prepolymer solution, a trialkoxysilane such as trimethoxysilane and, optionally in addition to the trialkoxylsilane, a trialkylsilane such as triethylsilane, may be added at a molar amount that results in reaction of the silanes with all of the monomers of the prepolymer that have vinyl groups. Thus, the modified prepolymer may have formula (E6), as in Example 3, but where the subscript a representing unreacted vinyl groups is zero.

The modified prepolymer is then reacted with water in the presence of an appropriate catalyst such as dibutyltin dilaurate (DBTDL), for example, or with a silanol compound, to replace silicon-bonded methoxy groups with hydroxyl groups with liberation of one molecule of methanol for every converted methoxy group. The result of either reaction is a separation layer solution containing a polymer having formula (E8):

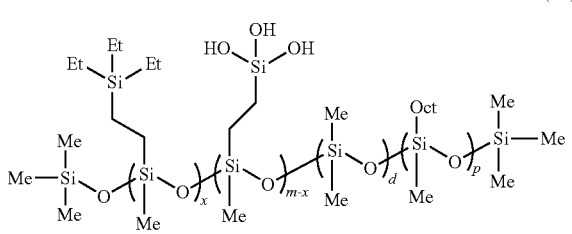

(E8)

The separation layer solution is cast onto a microporous polymer support, dried, and crosslinked, as described in Example 1. During crosslinking, a hydroxy group from each of two molecules of the compound of formula (E8) react with release of one molecule of water to form an intermolecular crosslink, one of which is illustrated as formula (E9):

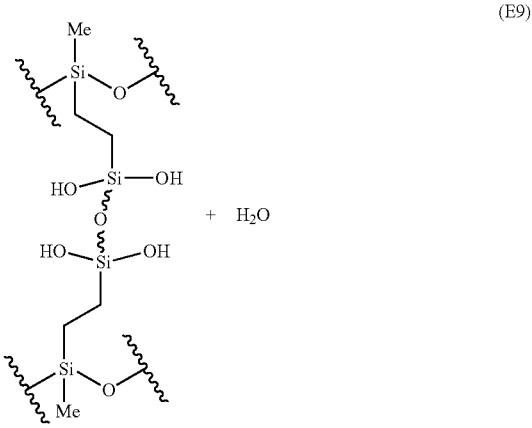

(E9)

When the polymer compound is fully crosslinked, all of the hydroxyl groups remaining in the structure of formula (E9) will have reacted with hydroxyl groups of other polymer molecules.

Characterizations and data with regard to a composite membrane prepared according to the foregoing procedure are provided in Example 10.

Example 7

Preparation of Composite Membrane 7

Composite Membrane 7 includes the polymer material of FIG. 8 on a microporous polymer support. The polymer material of Composite Membrane 7 is prepared by first dissolving in organic solvent the copolymer having formula (E10), where m is from 0.01 to 0.55 and x is less than m. The copolymer having formula (E10) is prepared in the same manner as the crosslinking agent of formula (E5) in Example 2 of this specification.

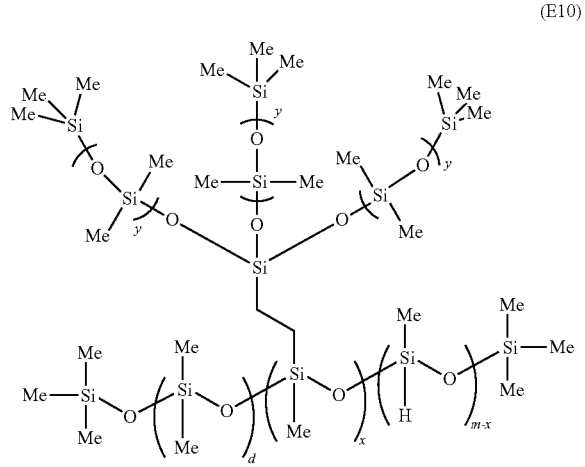

(E10)

The copolymer solution is then mixed with a sufficient molar amount of an ω-alkenyltrialkoxysilane of the formula $CH_2=CH(CH_2)_zSi(OR)_3$ (where z is an integer from 0 to 10 and R is an alkyl such as methyl or ethyl) to react with the remaining unreacted hydrogen atoms of the methylhydrosiloxane monomers represented by the subscript "m-x" in formula (E10). To form the polymer material of FIG. 8, the ω-alkenyltrialkoxysilane is an allyltrialkoxysilane such as, for example, allyltrimethoxysilane having the formula $=CH_2CH(CH_2)Si(OCH_3)_3$. Alternatively, a silane having shorter w-alkenyl group such as vinyl (z is zero) or a longer alkenyl group where z is an integer from 2 to 10. In general, the length of the w-alkenyl group of the w-alkenyltrialkoxysilane determines the length of crosslinking monomers present in the polymer material of Composite Membrane 7. A catalyst such as 1,3-diethenyl-1,1,3,3-tetramethyldisiloxane platinum complex is added slowly into the solution, followed by stirring for 5 minutes to 30 minutes at 25° C.

In the reaction product of the crosslinking agent having formula (E10) and allyltrimethoxysilane, the hydrogen atoms of the methylhydrosiloxane monomers of the copolymer are replaced with trimethoxysilyl-terminated groups $-(CH_2)_3Si(OCH_3)_3$. The separation layer solution is prepared by hydrolyzing this reaction product using a mild catalyst such as acetic acid to form a crosslinkable compound. By the hydrolysis, the trimethoxysilyl-terminated groups of the initial reaction product are converted to trihydroxysilyl-terminated groups $-(CH_2)_3Si(OH)_3$ in the crosslinkable compound.

The separation layer solution containing the crosslinkable compound is cast onto a microporous polymer support, dried, and crosslinked, as described in Example 1. During crosslinking, the hydroxyl groups of trihydroxysilyl-terminated groups $-(CH_2)_3Si(OH)_3$ from each of two molecules of the crosslinkable compound react with release of one molecule of water to form an intermolecular crosslink.

Comparative Example 8

Preparation of PDMS and POMS Composite Membranes

As bases for comparison, conventional composite membranes of poly(dimethylsiloxane) (PDMS) and poly(octylmethylsiloxane) (POMS) were prepared using polymers from commercial sources. The PDMS polymer was prepared from a two-part kit of a vinyl-terminated dimethylsiloxane oligomer (RTV615A, from Momentive Performance Materials) and an RTV615B crosslinker. The POMS polymer was prepared from a vinylmethylsiloxane-octylmethylsiloxane oligomer available from Gelest and the RTV615B crosslinker. Separation layer solutions of the PDMS and the POMS were prepared by dissolving polymer in an organic solvent such as chloroform or hexane and casting the separation layer solution onto a microporous polymer support and drying at 25° C. overnight to remove solvent.

Example 9

Characterization of Composite Membrane 2

A supported membrane (Composite Membrane 2) having the polymer material of FIG. 5 was prepared according to the procedure of Example 2 of this disclosure using polyacrylonitrile and non-woven poly(ethylene terephthalate) as the support. The supported films had uniform separation layer thicknesses of from 0.5 μm to 50 μm, uniform microporous support layer thicknesses of 30 μm to 60 μm, and non-woven structural support layer thickness of 100 μm to 250 μm. The supported membrane was characterized to determine permeability of the supported membrane to propane ($C_3H_8$) and butane ($C_4H_{10}$) at various pressures and temperatures, and to determine ratios of propane to methane ($CH_4$) ideal selectivity and butane to methane ideal selectivity.

It should be understood that polymer membranes separate components of a gas or vapor mixture because the components permeate the membrane at different rates. The permeability of a polymer membrane material for a gas, P [in units Barrer, where 1 Barrer=$10^{-10}$ ($cm^3_{STP}$·cm)/($cm^2$·s·$cm_{Hg}$)], is the rate at which that gas moves through a standard thickness [1 cm] of the membrane under a standard driving force (a pressure difference of 1 $cm_{Hg}$). A measure of the ability of a membrane to separate two gases is the selectivity, α, defined as the ratio of the gas permeabilities, $P_1/P_2$. Selectivity can also be expressed as:

$$\alpha = D_1/D_2 \cdot k_1/k_2$$

where D is the diffusion coefficient of the gas in the membrane (in units $cm^2$/s), which is a measure of the gas mobility, and k is the Henry's law sorption coefficient, which links the concentration of the gas in the membrane material to the pressure in the adjacent gas (in units $cm^3_{STP}$/$cm^3 \cdot cm_{Hg}$).

The ideal selectivity of a polymer material is established by measuring the permeabilities with pure gas or vapor samples, then calculating the ratio. The actual selectivity obtained in a real separation process is established by making permeation measurements with gas mixtures. Both high permeability and high selectivity are desirable, because a higher permeability decreases the size of membrane necessary to treat a given amount of gas, while higher selectivity results in a more highly purified product.

To determine the effects of feed pressure on $C_3H_8$ permeability and on $C_4H_{10}$ permeability in the conventional PDMS membrane, the conventional POMS membrane, and Composite Membrane 2 were tested using a custom designed constant volume gas permeation cell. A membrane is placed in the cell such that it forms a barrier between two halves of the cell: namely the upstream and the downstream. The upstream and downstream are both evacuated to degas the membrane. Then the upstream is pressurized with the desired gas at the desired pressure. The permeability of the gas is calculated by measuring the increase in downstream pressure over time (dp/dt) and using Equation 1:

$$P = \frac{\frac{\partial p}{\partial t} \cdot v \cdot l}{R \cdot T \cdot SA \cdot p}$$  Equation 1

In Equation 1, P is the permeability, v is the volume of the downstream chamber, l is the membrane thickness, R is the ideal gas constant, T is the absolute temperature, SA is the surface area of the membrane, and p is the upstream pressure. By performing this permeation test with each gas of interest, ideal selectivities are calculated.

To determine the ideal selectivity ratios $C_3H_8/CH_4$ and $C_4H_{10}/CH_4$ in the conventional PDMS membrane, the conventional POMS membrane, and Composite Membrane 2 at a particular pressure and temperature, the ratio of permeabilities is calculated for a given gas pair ($C_3H_8/CH_4$ or $C_4H_{10}/CH_4$) at the same pressure and temperature.

Figure 9:
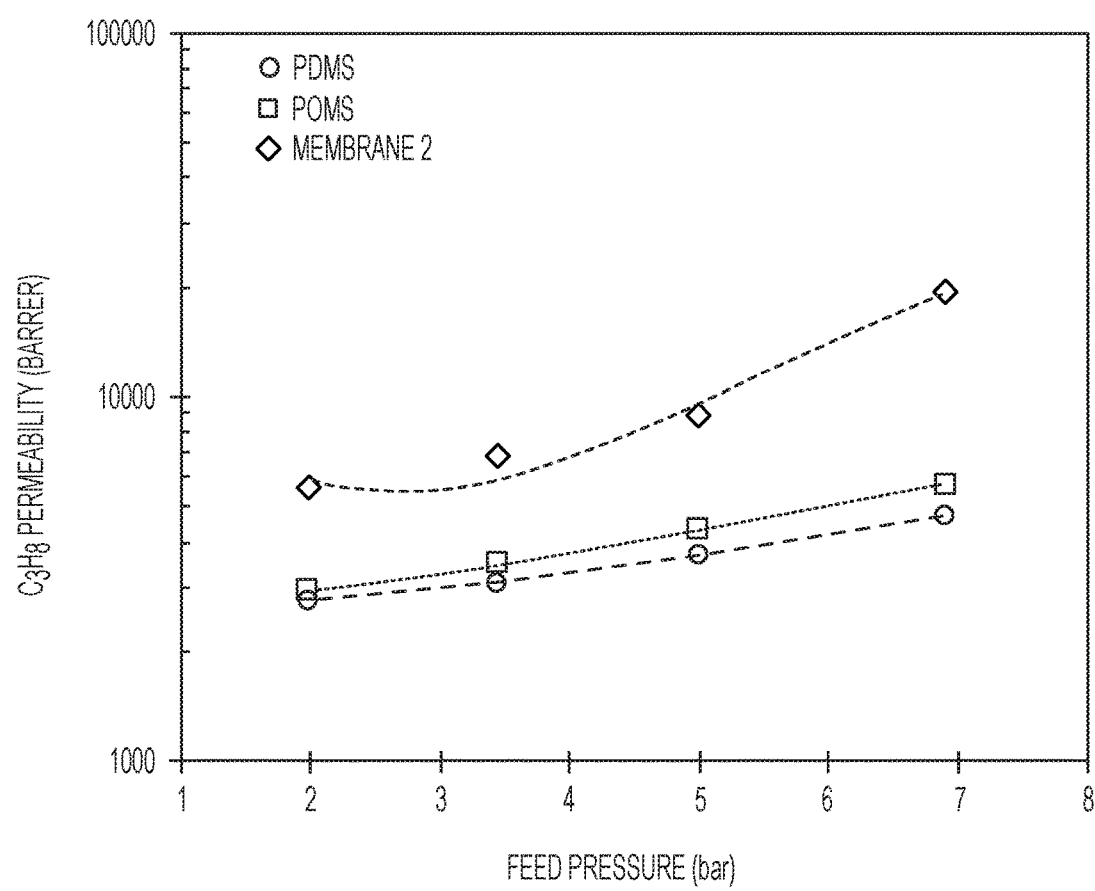
FIG. 9 is a graph of $C_3H_8$ permeability of a composite membrane according to an embodiment, PDMS, and POMS at 25° C., over a feed pressure range of 2.0 bar to 7.0 bar.

The effect of feed pressure on $C_3H_8$ permeability of Composite Membrane 2, PDMS, and POMS was measured at 25° C., over a feed pressure range of 2.0 bar to 7.0 bar. The data are summarized in FIG. 9. The $C_3H_8$ permeability generally increased with increased feed pressure. At all feed pressures, the Composite Membrane 2 was more permeable to $C_3H_8$ than were both the PDMS membrane and the PMOS membrane. For example, at 2.0 bar feed pressure, Composite Membrane 2 had a $C_3H_8$ permeability of about 5,584 Barrer, compared to about 2,800 and 2,900 Barrer for both PDMS and POMS, respectively. At a feed pressure of 7.0 bar, Composite Membrane 2 had a $C_3H_8$ permeability of about 19,400 Barrer, compared to about 5,700 Barrer for POMS and 4,700 Barrer for PDMS.

Figure 10:
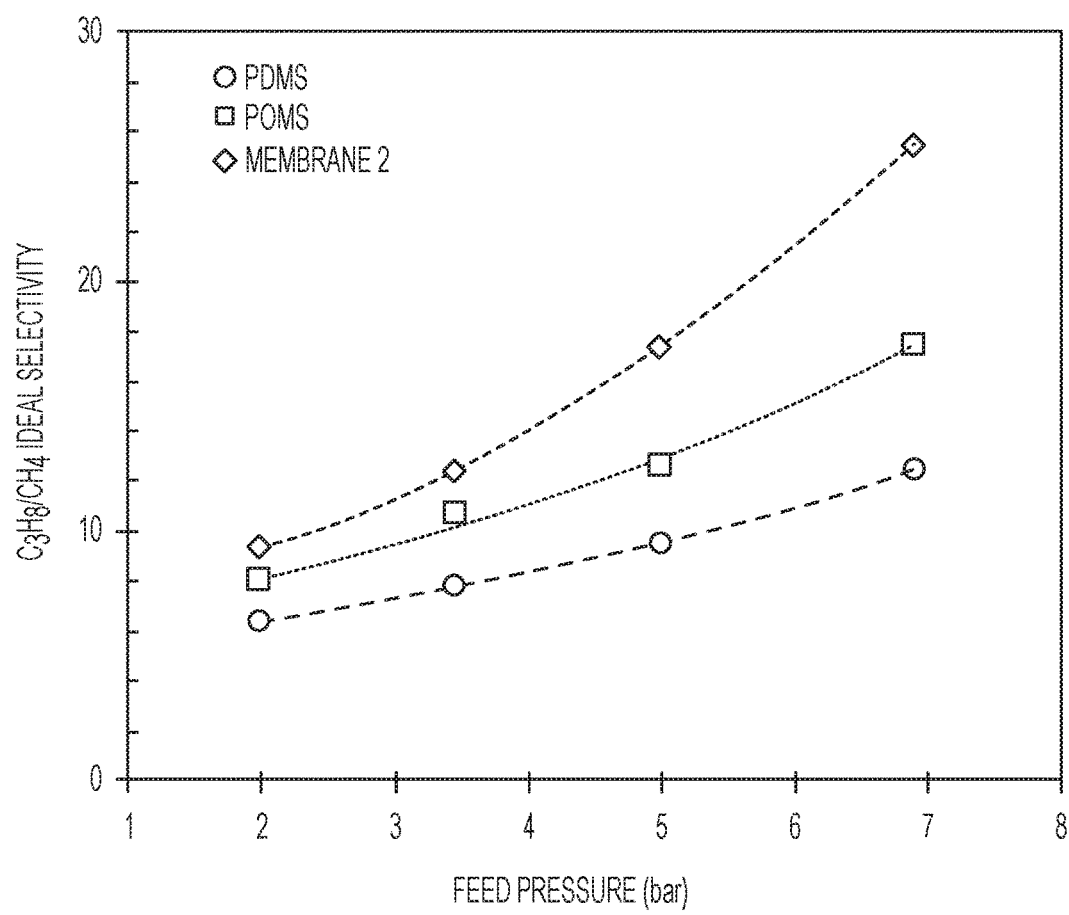
FIG. 10 is a graph of $C_3H_8/CH_4$ ideal selectivity in a composite membrane according to an embodiment, PDMS, and POMS was measured at 25° C., over a feed pressure range of 2.0 bar to 7.0 bar.

The effect of feed pressure on $C_3H_8/CH_4$ ideal selectivity in Composite Membrane 2, PDMS, and POMS was measured at 25° C., over a feed pressure range of 2.0 bar to 7.0 bar. The data are summarized in FIG. 10. At all feed pressures tested, the Composite Membrane 2 had greater $C_3H_8/CH_4$ ideal selectivity than both the PDMS membrane and the POMS membrane. The $C_3H_8/CH_4$ ideal selectivity of all membranes increased with increasing feed pressure, with the increase being most pronounced for Composite Membrane 2. For example, at feed pressure 2.0 bar, Composite Membrane 2 had a $C_3H_8/CH_4$ ideal selectivity of about 9.4, which increased by about 171% to about 25 at 7.0 bar. In comparison, the corresponding increase for POMS was about 117% (8.0 at 2.0 bar and 17.4 at 7.0 bar), and the corresponding increase for PDMS was about 95% (6.4 at 2.0 bar and 12.4 at 7.0 bar).

Figure 11:
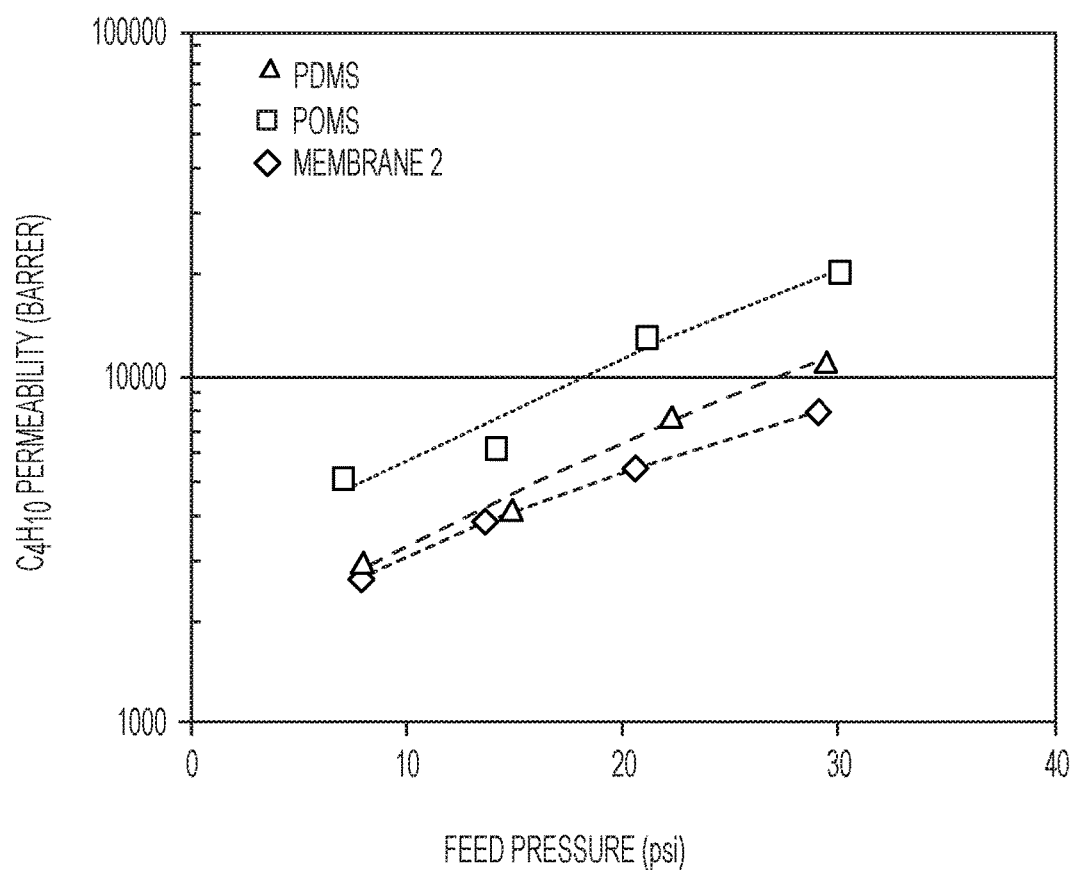
FIG. 11 is a graph of $C_4H_{10}$ permeability of a composite membrane according to an embodiment, PDMS, and POMS measured at 25° C., over a feed pressure range of 7 psi to 30 psi.

The effect of feed pressure on $C_4H_{10}$ permeability of Composite Membrane 2, PDMS, and POMS was measured at 25° C., over a feed pressure range of 7 psi to 30 psi. The data are summarized in FIG. 11. The $C_4H_{10}$ permeability generally increased with increased feed pressure, similar to the trend observed with $C_3H_8$. At all feed pressures, the Composite Membrane 2 was more permeable to $C_4H_{10}$ than were both the PDMS membrane and the POMS membrane.

Figure 12:
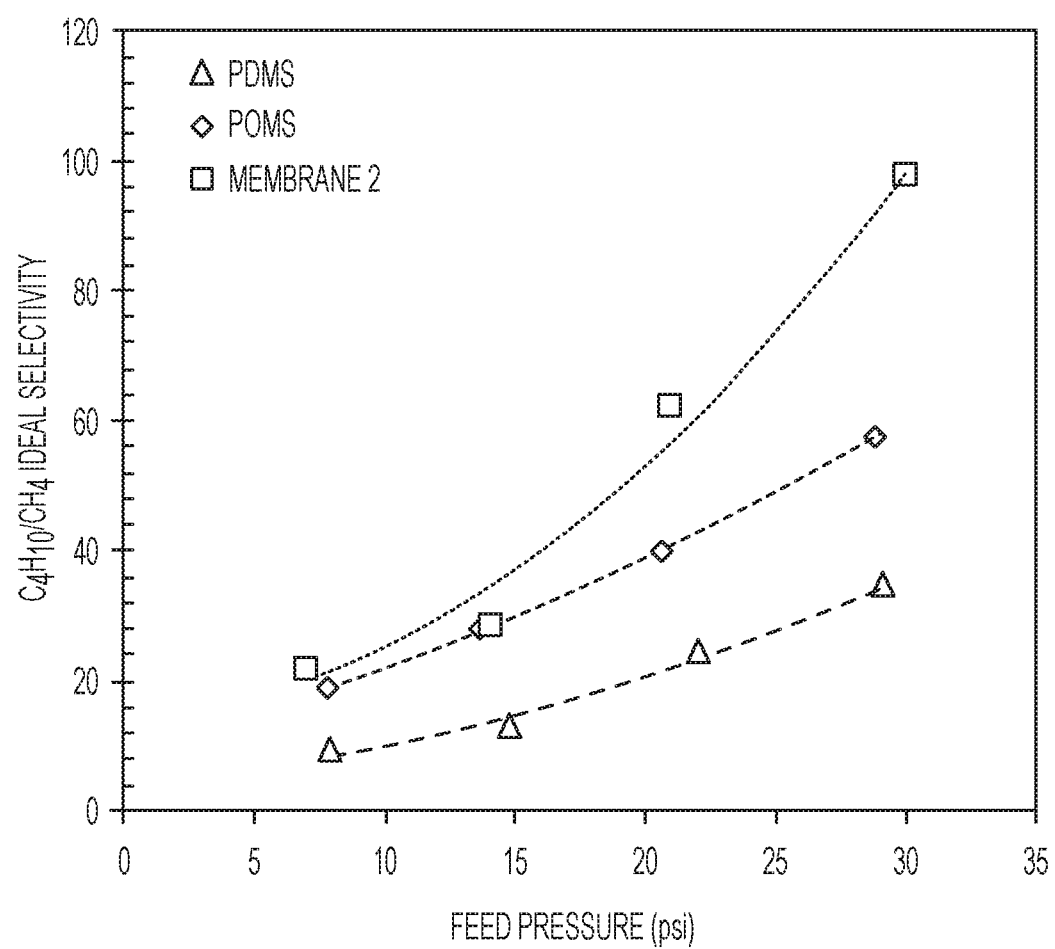
FIG. 12 is a graph of $C_4H_{10}/CH_4$ ideal selectivity in a composite membrane according to an embodiment, PDMS, and POMS measured at 25° C., over a feed pressure range of 7 psi to 30 psi.

The effect of feed pressure on $C_4H_{10}/CH_4$ ideal selectivity in Composite Membrane 2, PDMS, and POMS was measured at 25° C., over a feed pressure range of 7 psi to 30 psi. The data are summarized in Table 1 and are graphed in FIG. 12. At all feed pressures tested, the Composite Membrane 2 had greater $C_4H_{10}/CH_4$ ideal selectivity at 25° C. than both the PDMS membrane and the POMS membrane. The $C_4H_{10}/CH_4$ ideal selectivity of all membranes increased with increasing feed pressure, with the increase being most pronounced for Composite Membrane 2. For example, at feed pressure 7 psi, Composite Membrane 2 had a $C_4H_{10}/CH_4$ ideal selectivity of about 21.9, which increased by about 344% to about 97.3 at 30 psi. In comparison, the corresponding increase for POMS was about 200% (19.3 at 7 psi and 57.9 at 30 psi), and the corresponding increase for PDMS was about 272% (9.6 at 7 psi and 35.6 at 30 psi).

TABLE 1

| Membrane | Pressure (psi) | $C_4H_{10}/CH_4$ Ideal Selectivity |
| --- | --- | --- |
| PDMS (Comparative) | 7.9 | 9.6 |
|  | 14.8 | 13.3 |
|  | 22.1 | 25.0 |
|  | 29.2 | 35.6 |
| POMS (Comparative) | 7.8 | 19.3 |
|  | 13.6 | 28.0 |
|  | 20.6 | 40.0 |
|  | 28.9 | 57.9 |
| Composite Membrane 2 | 7.0 | 21.9 |
|  | 14.0 | 28.4 |
|  | 21.0 | 62.1 |
|  | 30.0 | 97.3 |

Figure 13:
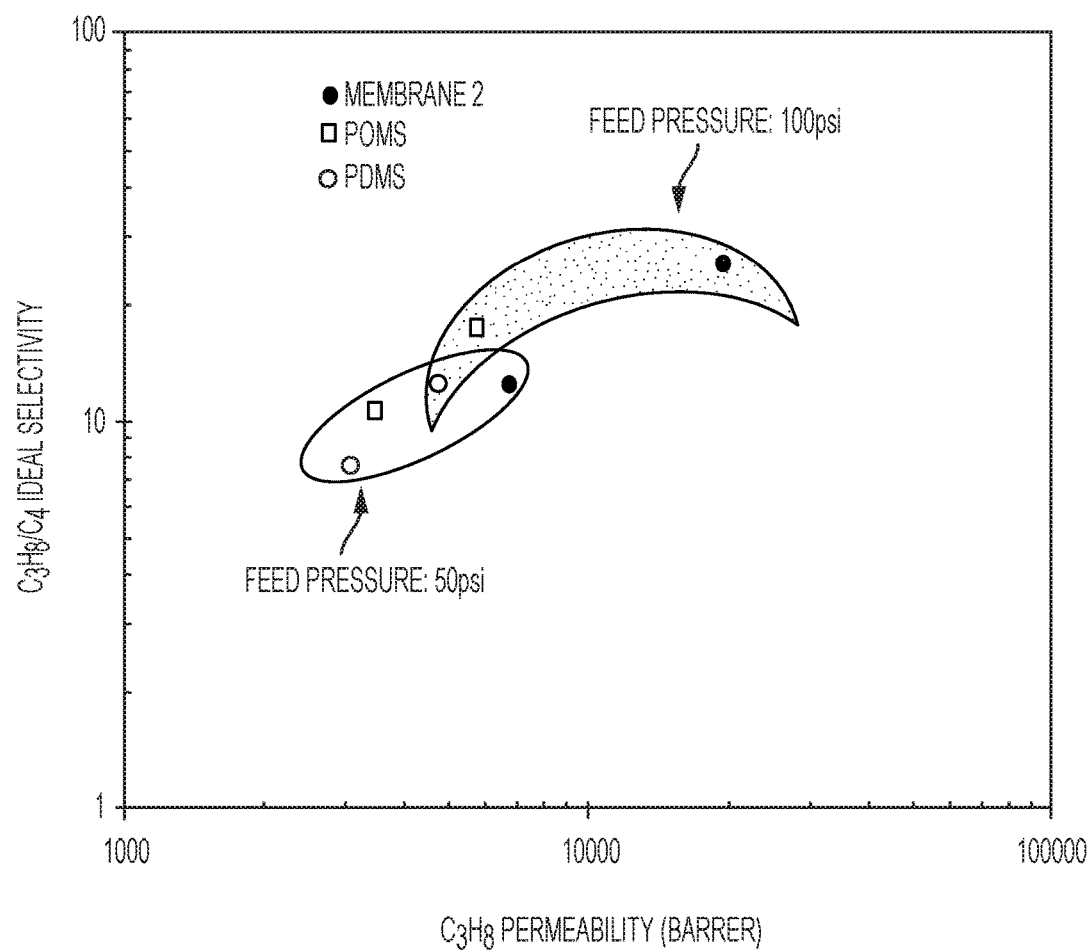
FIG. 13 is a graph of $C_3H_8$ permeability versus $C_3H_8/CH_4$ ideal selectivity for PDMS, POMS, and a composite membrane according to an embodiment, measured at a temperature of 25° C. and at feed pressures of 50 psi and 100 psi.

The $C_3H_8/CH_4$ and $C_4H_{10}/CH_4$ separation performances of Composite Membrane 2, PDMS and POMS were investigated. In FIG. 13, $C_3H_8$ permeability versus $C_3H_8/CH_4$ ideal selectivity is plotted for PDMS, POMS, and Composite Membrane 2, measured at a temperature of 25° C. and at feed pressures of 50 psi and 100 psi. At both 50 psi and 100 psi, the Composite Membrane 2 was both more permeable to $C_3H_8$ than were PDMS and POMS, and the Composite Membrane 2 was more selective to $C_3H_8$ over $CH_4$ than were PDMS and POMS.

Figure 14:
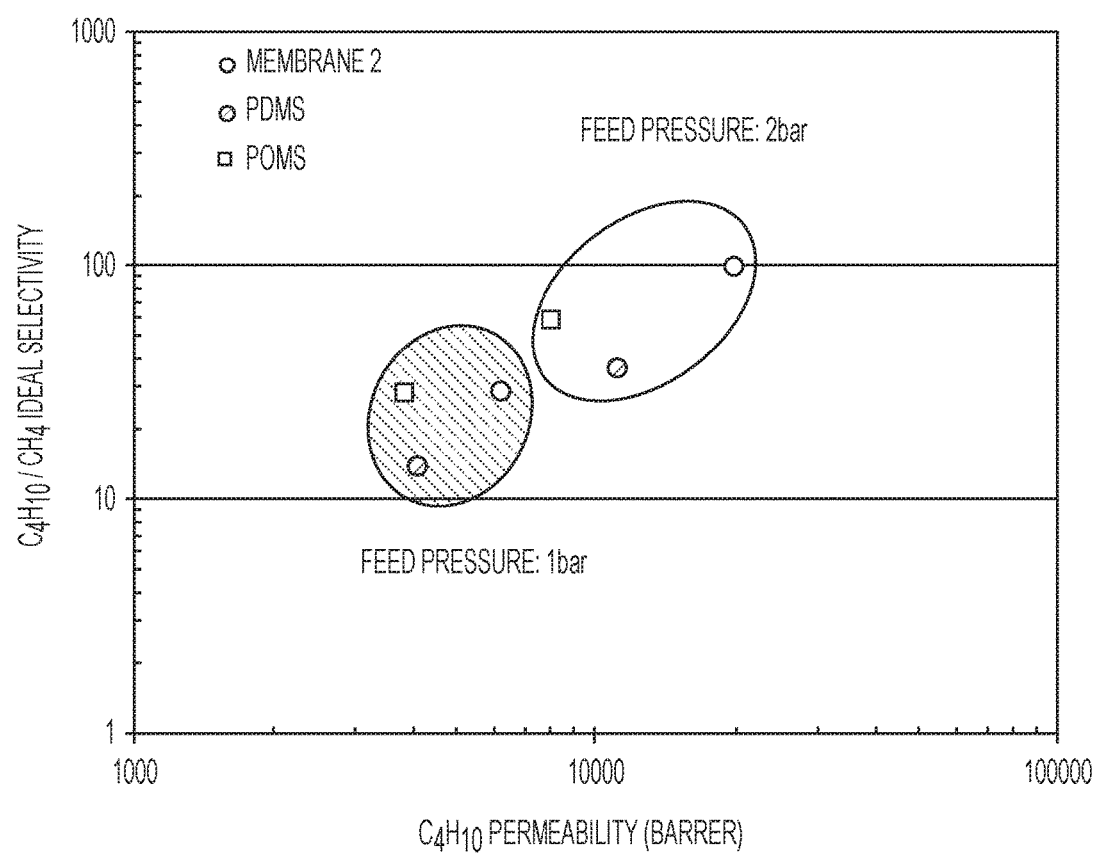
FIG. 14 is a graph of $C_4H_{10}$ permeability versus $C_4H_{10}/CH_4$ ideal selectivity for PDMS, POMS and a composite membrane according to an embodiment, measured at a temperature of 25° C. and at feed pressures of 1 bar and 2 bar.

In FIG. 14, $C_4H_{10}$ permeability versus $C_4H_{10}/CH_4$ ideal selectivity is plotted for PDMS, POMS, and Composite Membrane 2, measured at a temperature of 25° C. and at feed pressures of 1 bar and 2 bar. At both 1 bar and 2 bar, the Composite Membrane 2 was both more permeable to $C_4H_{10}$ than were PDMS and POMS, and the Composite Membrane 2 was more selective to $C_4H_{10}$ over $CH_4$ than were PDMS and POMS.

Figure 18:
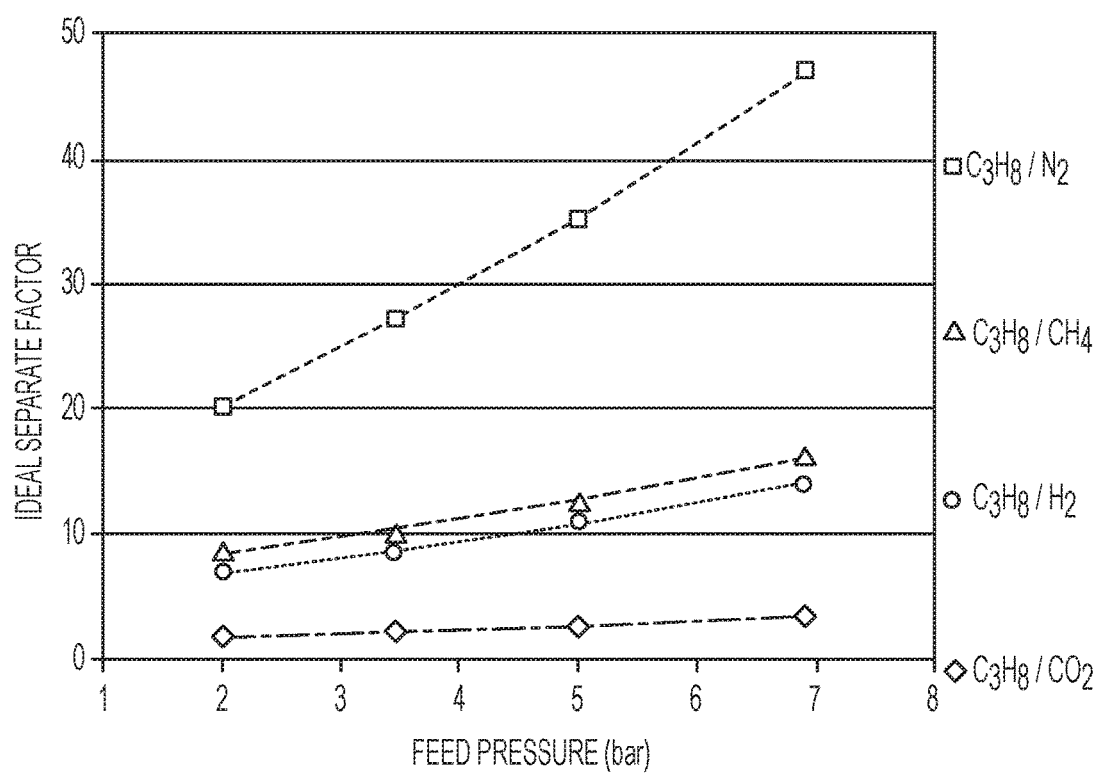
FIG. 18 is a graph of ideal selectivity of a composite membrane according to an embodiment to $C_3H_8$ over four gases typically found in natural gas sources (nitrogen, methane, hydrogen, and carbon dioxide) at 25° C., over a range of feed pressure from 2.0 bar to 7.0 bar.

The effect of feed pressure on ideal selectivity at 25° C. of $C_3H_8$ over four gases typically found in natural gas sources (nitrogen, methane, hydrogen, and carbon dioxide) was evaluated for Composite Membrane 2 over a range of feed pressure from 2.0 bar to 7.0 bar, using the ideal selectivity measurement techniques described in Example 9 of this disclosure, where methane was replaced with nitrogen, hydrogen, or carbon dioxide for the applicable experiment. The data for these experiments are presented in FIG. 18. At 25° C. and over the entire range of feed pressure evaluated, the Composite Membrane 2 consistently exhibited strong ideal selectivity to $C_3H_8$ over each of the four test gases. The increasing rate of ideal selectivity with pressure is observed to depend on the difference between the condensabilities or critical volumes of $C_3H_8$ and other gases. At the feed pressure of 6.9 bar, Composite Membrane 2 was approximately 3.6 times more permeable to $C_3H_8$ than to $CO_2$, approximately 13.9 times more permeable to $C_3H_8$ than to $H_2$, approximately 16.4 times more permeable to $C_3H_8$ than to $CH_4$, and approximately 47.2 times more permeable to $C_3H_8$ than to $N_2$.

Example 10

Characterization of Composite Membrane 6

A supported membrane (Composite Membrane 6) having the polymer material of FIG. 7 was prepared according to the procedure of Example 6 of this disclosure. The supported membrane was characterized to evaluate its FTIR spectrum before and after crosslinking, the effects of feed pressure on $C_3H_8$ permeability, the effects of the operating temperature on $C_3H_8/CH_4$ ideal selectivity, and selectivity of $C_3H_8$ over various gases as a function of feed pressure.

Figure 15:
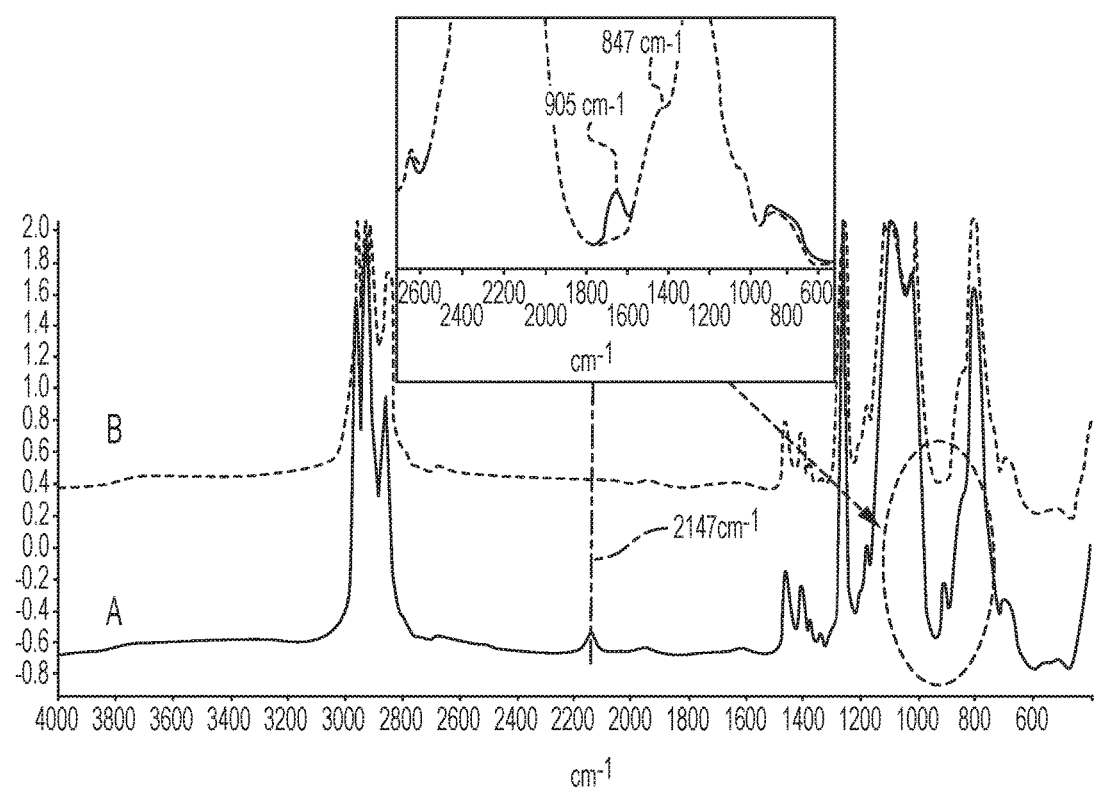
FIG. 15 includes overlain Fourier-transform infrared (FTIR) spectra of polymer materials of composite membranes according to embodiments, before crosslinking (A) and after crosslinking (B).

Fourier-Transform infrared (FTIR) spectra were collected from samples of the polymer material of Composite Membrane 6 before and after crosslinking. In FIG. 15, the FTIR spectrum (B) of the material crosslinked for four hours at 70° C. overlays the FTIR spectrum (A) of polymer material before crosslinking. The crosslinked material was found to lack a peak at 2147 $cm^{-1}$, attributable to Si—H stretching, and a peak at 905 $cm^{-1}$ attributable to Si—H bending vibrations, thus indicating that the crosslinking agent (silane Si—H) had nearly completely reacted with the PDMS. It is believed that the FTIR spectra follow the consumption of the silane groups during the crosslinking process and thereby indicate the effect of the silane concentration in the crosslinking reaction. Thus, when the peak at 902 $cm^{-1}$ disappears, it may be presumed that the crosslinking reaction is complete.

Figure 16:
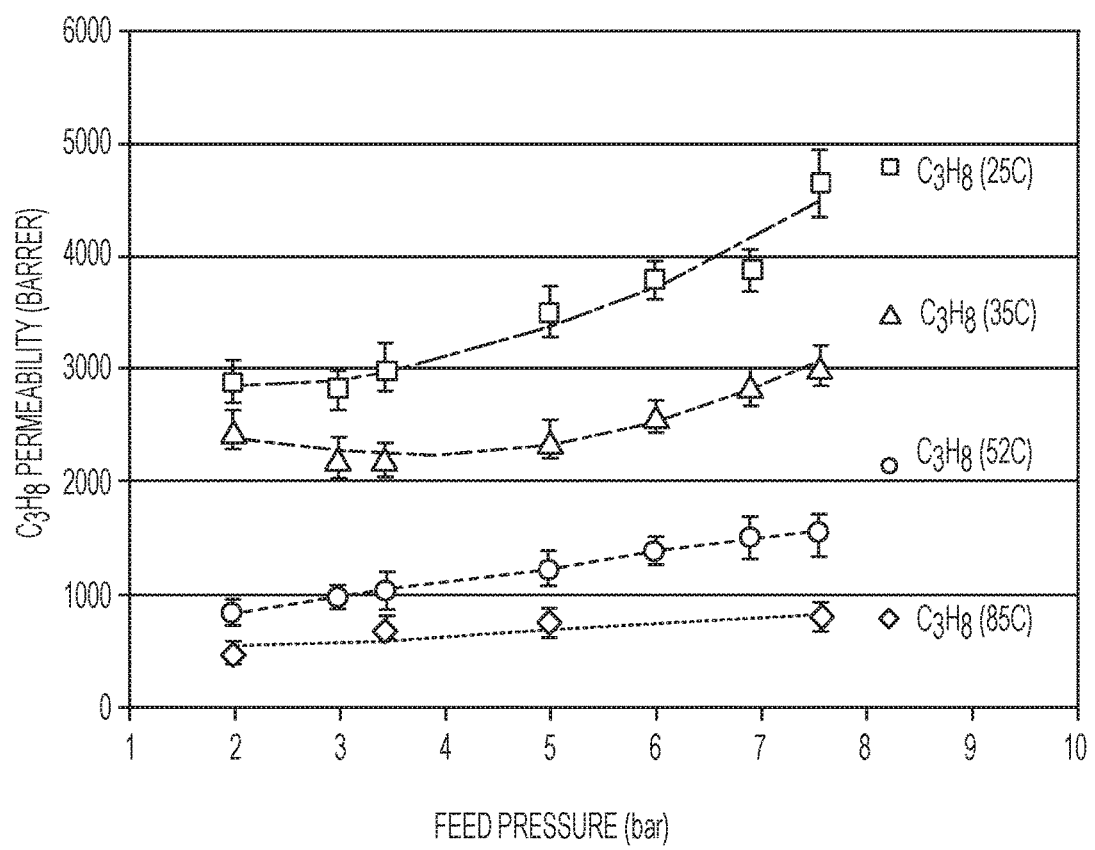
FIG. 16 is a graph of $C_3H_8$ permeability of a composite membrane according to an embodiment measured at four temperatures over a feed pressure range of 2.0 bar to 7.5 bar.

The effect of feed pressure on $C_3H_8$ permeability of Composite Membrane 6 was measured at four temperatures (25° C., 35° C., 52° C., and 85° C.) over the feed pressure range of 2.0 bar to 7.5 bar, following the measurement procedure described in Example 9. The data are summarized in FIG. 16. Increased temperatures correspond with decreased solubility coefficients in condensable gases such as $C_3H_8$, resulting in a significant increase in $C_3H_8$ permeability at low temperature. But for non-condensable gases such as methane and nitrogen, decreasing the temperature caused permeability to decrease. Therefore, membrane $C_3H_8/CH_4$ selectivity increases dramatically with a decrease of feed temperature. Similarly, the $C_3H_8$ permeability of PDMS control membranes were tested at the same conditions (temperature: 25° C., 35° C., 52° C., and 85° C.) over the feed pressure range of 2.0 bar to 7.5 bar). The change of $C_3H_8$ relative permeability ($P_p/P_{2bar}$) with the increase of the applied $C_3H_8$ feed pressure at different feed temperatures was studied both for Composite Membrane 6 and PDMS control. Results showed Composite Membrane 6 to have a greater resistance to swelling than the PDMS control.

Figure 17:
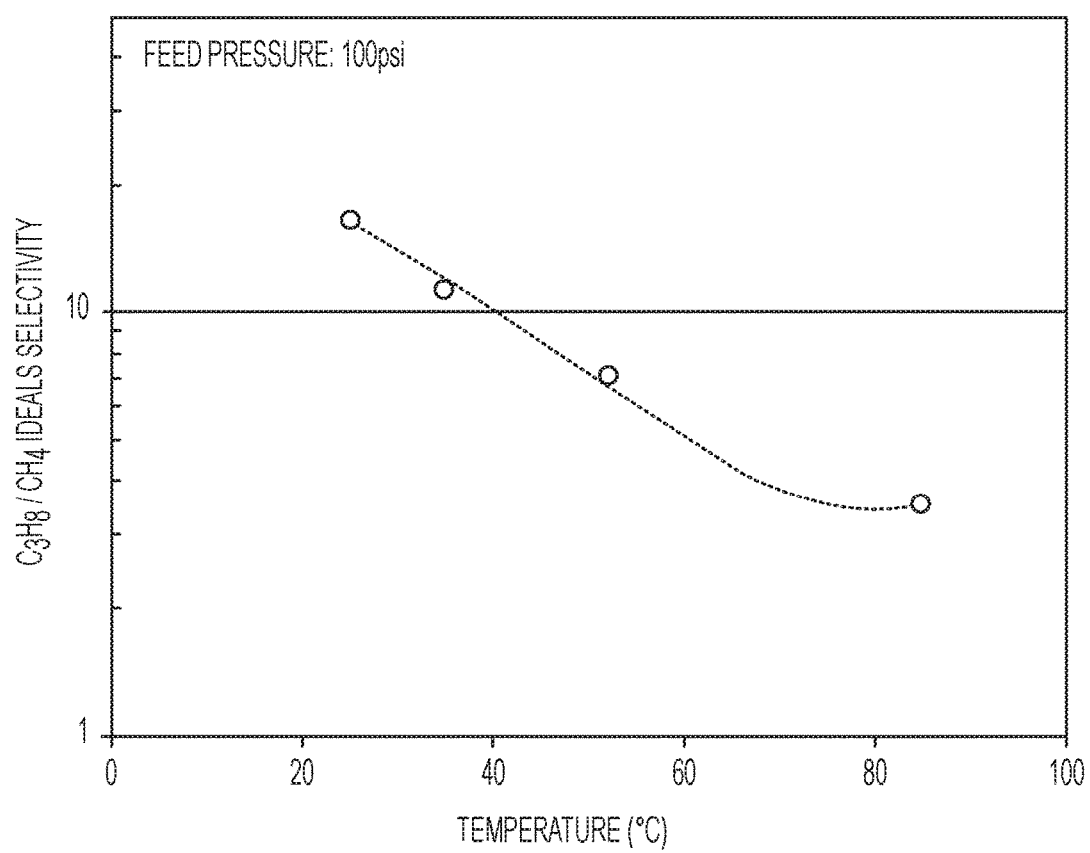
FIG. 17 is a graph of $C_3H_8/CH_4$ ideal selectivity of a composite membrane according to an embodiment at a constant feed pressure of 100 pounds per square inch and at four temperatures (25° C., 35° C., 52° C., and 85° C.).

The effect of operating temperature on $C_3H_8/CH_4$ ideal selectivity of Composite Membrane 6 at a constant feed pressure of 100 pounds per square inch (6.89 bar) was evaluated by measuring $C_3H_8/CH_4$ ideal selectivity at four temperatures (25° C., 35° C., 52° C., and 85° C.), following the measurement procedure described in Example 9. The data are presented in FIG. 17. The $C_3H_8/CH_4$ ideal selectivity of Composite Membrane 6 was found to decrease from about 10.5 at 25° C. to about 2.8 at 85° C.

Example 11

Preparation of Composite Membrane 8

Composite Membrane 8 includes the polymer material of FIG. 19, where $R^1$ is octyl and $R^7$ is hydrogen, on a microporous polymer support. The polymer material of FIG. 19, where $R^1$ is octyl and $R^7$ is hydrogen, is prepared from a prepolymer according to formula (E3) (see Example 1), where $R^1$ is octyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is hydrogen, n is 0.5, and b is 0.5. A separation layer solution of the resulting polymer is then cast onto a microporous polymer support, dried, and crosslinked, as described in Example 1.

An exemplary Composite Membrane 8 was prepared by the foregoing method with a crosslinking agent having a weight-average molecular weight of 1400 Dalton to 2400 Dalton. Characterization data for the exemplary Composite Membrane 8 are provided in Example 21.

Example 12

Preparation of Composite Membrane 9

Composite Membrane 9 includes the polymer material of FIG. 19, where $R^1$ is octyl and $R^7$ is methyl, on a microporous polymer support. The polymer material of FIG. 19, where $R^1$ is octyl and $R^7$ is methyl, is prepared from a prepolymer according to formula (E3) (see Example 1), where $R^1$ is octyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is methyl, n is from 0.005 to 0.55, and b is from 0.45 to 0.995. A separation layer solution of the resulting polymer is then cast onto a microporous polymer support, dried, and crosslinked, as described in Example 1.

An exemplary Composite Membrane 9 was prepared by the foregoing method with a crosslinking agent having a weight-average molecular weight of 900 Dalton to 65,000 Dalton. Characterization data for the exemplary Composite Membrane 9 are provided in Example 21.

Example 13

Preparation of Composite Membrane 10

Composite Membrane 10 includes the polymer material of FIG. 19, where $R^1$ is octyl and $R^7$ is octyl, on a microporous polymer support. The polymer material of FIG. 19, where $R^1$ is octyl and $R^7$ is octyl, is prepared from a prepolymer according to formula (E3) (see Example 1), where $R^1$ is octyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is octyl, n is from 0.25 to 0.30, and b is from 0.70 to 0.75. A separation layer solution of the resulting polymer is then cast onto a microporous polymer support, dried, and crosslinked, as described in Example 1.

An exemplary Composite Membrane 10 was prepared by the foregoing method with a crosslinking agent having a weight-average molecular weight of 280 Dalton to 480 Dalton. Characterization data for the exemplary Composite Membrane 8 are provided in Example 21.

Example 14

Preparation of Composite Membrane 11

Composite Membrane 11 includes the polymer material of FIG. 19, where $R^1$ is octyl and $R^7$ is phenyl, on a microporous polymer support. The polymer material of FIG. 19, where $R^1$ is octyl and $R^7$ is phenyl, is prepared from a prepolymer according to formula (E3) (see Example 1), where $R^1$ is octyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is phenyl, n is from 0.45 to 0.50, and b is from 0.50 to 0.55. A separation layer solution of the resulting polymer is then cast onto a microporous polymer support, dried, and crosslinked, as described in Example 1.

An exemplary Composite Membrane 11 was prepared by the foregoing method with a crosslinking agent having a weight-average molecular weight of 160 Dalton to 170 Dalton. Characterization data for the exemplary Composite Membrane 11 are provided in Example 21.

Example 15

Preparation of Composite Membrane 12

Composite Membrane 12 includes the polymer material of FIG. 20 on a microporous support. The polymer material of FIG. 19 is prepared from a prepolymer according to formula (E3) (see Example 1), where $R^1$ is phenyl; p is from 0.35 to 0.40, m is from 0.03 to 0.05, and d+p+m=1. The prepolymer is dissolved in organic solvent and reacted in the presence of a catalyst with a hydride-terminated polymethylsiloxane crosslinking agent according to formula (E11) where y is an integer from 1 to 850, from 1 to 500, from 1 to 100, from 1 to 50, from 1 to 40, from 1 to 30, from 1 to 20, from 1 to 10, or from 1 to 5:

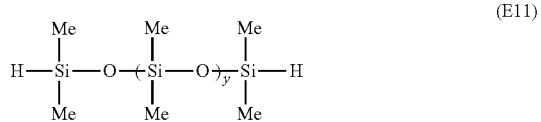

(E11)

A separation layer solution of the resulting polymer is then cast onto a microporous polymer support, dried, and crosslinked, as described in Example 1. In the polymer material of FIG. 20, crosslinking occurs at the crosslinking sites $Z^1$, generally through the reaction of the hydride on the end of the crosslinking agent not already attached to a polysiloxane backbone with a vinyl group of a vinylmethylsiloxane monomer in a second polymer backbone.

An exemplary Composite Membrane 12 was prepared by the foregoing method with a prepolymer having a weight-average molecular weight of 2500 Dalton to 3000 Dalton and a crosslinking agent having a weight-average molecular weight of 400 Dalton to 63,000 Dalton. The reaction of the hydride-terminated polymethylsiloxane crosslinking agent according to formula (E11) with the prepolymer according to formula (E3) was considerably faster than the reaction of the crosslinking agent according to formula (E7) with the prepolymer according to formula (E3) in Example 14. It is believed that the greater reactivity of the hydride-terminated polymethylsiloxane crosslinking agent according to formula (E11) resulted in a polymer material of FIG. 20 that was tougher and had a greater crosslinking density than that of the polymer material of FIG. 19 (Example 14).

Example 16

Preparation of Composite Membrane 13

Composite Membrane 13 includes the polymer material of FIG. 19, where $R^1$ is phenyl and $R^7$ is hydrogen, on a microporous polymer support. The polymer material of FIG. 19, where $R^1$ is phenyl and $R^7$ is hydrogen, is prepared from a prepolymer according to formula (E3) (see Example 1), where $R^1$ is phenyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is hydrogen, n is 0.50, and b is 0.50. A separation layer solution of the resulting polymer is then cast onto a microporous polymer support, dried, and crosslinked, as described in Example 1.

An exemplary Composite Membrane 13 was prepared by the foregoing method with a prepolymer having a weight-average molecular weight of 2500 Dalton to 3000 Dalton and a crosslinking agent having a weight-average molecular weight of 14,000 Dalton to 24,000 Dalton. Characterization data for the exemplary Composite Membrane 13 are provided in Example 21.

Example 17

Preparation of Composite Membrane 14

Composite Membrane 14 includes the polymer material of FIG. 19, where $R^1$ is phenyl and $R^7$ is methyl, on a microporous polymer support. The polymer material of FIG. 19, where $R^1$ is phenyl and $R^7$ is methyl, is prepared from a prepolymer according to formula (E3) (see Example 1), where $R^1$ is phenyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is methyl, n is from 0.005 to 0.55, and b is from 0.45 to 0.995. A separation layer solution of the resulting polymer is then cast onto a microporous polymer support, dried, and crosslinked, as described in Example 1.

An exemplary Composite Membrane 14 was prepared by the foregoing method with a prepolymer having a weight-average molecular weight of 2500 Dalton to 3000 Dalton and a crosslinking agent having a weight-average molecular weight of 900 Dalton to 65,000 Dalton.

Example 18

Preparation of Composite Membrane 15

Composite Membrane 15 includes the polymer material of FIG. 19, where $R^1$ is phenyl and $R^7$ is octyl, on a microporous polymer support. The polymer material of FIG. 19, where $R^1$ is phenyl and $R^7$ is octyl, is prepared from a prepolymer according to formula (E3) (see Example 1), where $R^1$ is phenyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is octyl, n is from 0.25 to 0.30, and b is from 0.70 to 0.75. A separation layer solution of the resulting polymer is then cast onto a microporous polymer support, dried, and crosslinked, as described in Example 1.

An exemplary Composite Membrane 15 was prepared by the foregoing method with a prepolymer having a weight-average molecular weight of 2500 Dalton to 3000 Dalton and a crosslinking agent having a weight-average molecular weight of 280 Dalton to 480 Dalton.

Example 19

Preparation of Composite Membrane 16

Composite Membrane 16 includes the polymer material of FIG. 19, where $R^1$ is phenyl and $R^7$ is phenyl, on a microporous polymer support. The polymer material of FIG. 19, where $R^1$ is phenyl and $R^7$ is phenyl, is prepared from a prepolymer according to formula (E3) (see Example 1), where $R^1$ is phenyl; p is from 0.35 to 0.40, m is from 0.03 to 0.05, and d+p+m=1. The prepolymer is dissolved in organic solvent and reacted in the presence of a catalyst with a crosslinking agent according to formula (E7) (see Example 3), where $R^7$ is phenyl, n is from 0.45 to 0.50, and b is from 0.50 to 0.55. A separation layer solution of the resulting polymer is then cast onto a microporous polymer support, dried, and crosslinked, as described in Example 1.

An exemplary Composite Membrane 15 was prepared by the foregoing method with a prepolymer having a weight-average molecular weight of 2500 Dalton to 3000 Dalton and a crosslinking agent having a weight-average molecular weight of 160 Dalton to 170 Dalton.

Example 20

Preparation of Composite Membrane 17

Composite Membrane 17 includes the polymer material of FIG. 5, where $R^1$ is phenyl, on a microporous polymer support. The polymer material of FIG. 5 where $R^1$ is phenyl is prepared by the same method as described for Composite Membrane 2 in Example 2, except that to form the separation layer the crosslinking agent of formula (E5) is reacted with a prepolymer vinylmethylsiloxane-phenylmethylsiloxane-dimethylsiloxane terpolymer according to formula (E3), where $R^1$ is phenyl, m is from 0.03 to 0.05, p is from 0.35 to 0.40, having a weight-average molecular weight of 2500 Dalton to 3000 Dalton.

An exemplary Composite Membrane 17 was prepared by the foregoing method with a prepolymer having a weight-average molecular weight of 2500 Dalton to 3000 Dalton. Characterization data for the exemplary Composite Membrane 17 are provided in Example 21.

Example 21

Characterizations of Composite Membranes 8-11, 13, and 17

The $C_3H_8$ permeabilities and $C_3H_8/CH_4$ ideal selectivities of Composite Membranes 8-11, 13, and 17 and of the PDMS and POMS of Comparative Example 8 were measured at 25° C., at a feed pressure of 50 psi (3.4 bar) following the measurement procedure described in Example 9 of this disclosure. The $C_4H_{10}$ permeabilities and $C_4H_{10}/CH_4$ ideal selectivities of Composite Membranes 8-11, 13, and 17 were measured at 25° C., at a feed pressure of 1 bar (14.5 psi) following the measurement procedure described in Example 9 of this disclosure. The data from these experiments are summarized in Table 2.

TABLE 2

| Membrane | $C_3H_8$ Permeability at 50 psi (Barrer) | $C_3H_8/CH_4$ Ideal Selectivity at 50 psi | $C_4H_{10}$ Permeability at 1 bar (Barrer) | $C_4H_{10}/CH_4$ Ideal Selectivity at 1 bar |
|---|---|---|---|---|
| PDMS (Comparative) | 3074.6 | 7.7 | 4144.3 | 13.3 |
| POMS (Comparative) | 3465.8 | 10.6 | 3852.8 | 28.0 |
| Composite Membrane 8 | 4092.4 | 10.3 | 8750.2 | 19.7 |
| Composite Membrane 9 | 8478.6 | 10.2 | 20449.2 | 31.2 |
| Composite Membrane 10 | 297.3 | 12.3 | 940.1 | 38.8 |
| Composite Membrane 11 | 4403.9 | 12.4 | 10215.7 | 37.1 |
| Composite Membrane 13 | 632.7 | 9.25 | 1732.4 | 25.5 |
| Composite Membrane 17 | 977.2 | 12.8 | 8264.3 | 47.9 |

Figure 21:
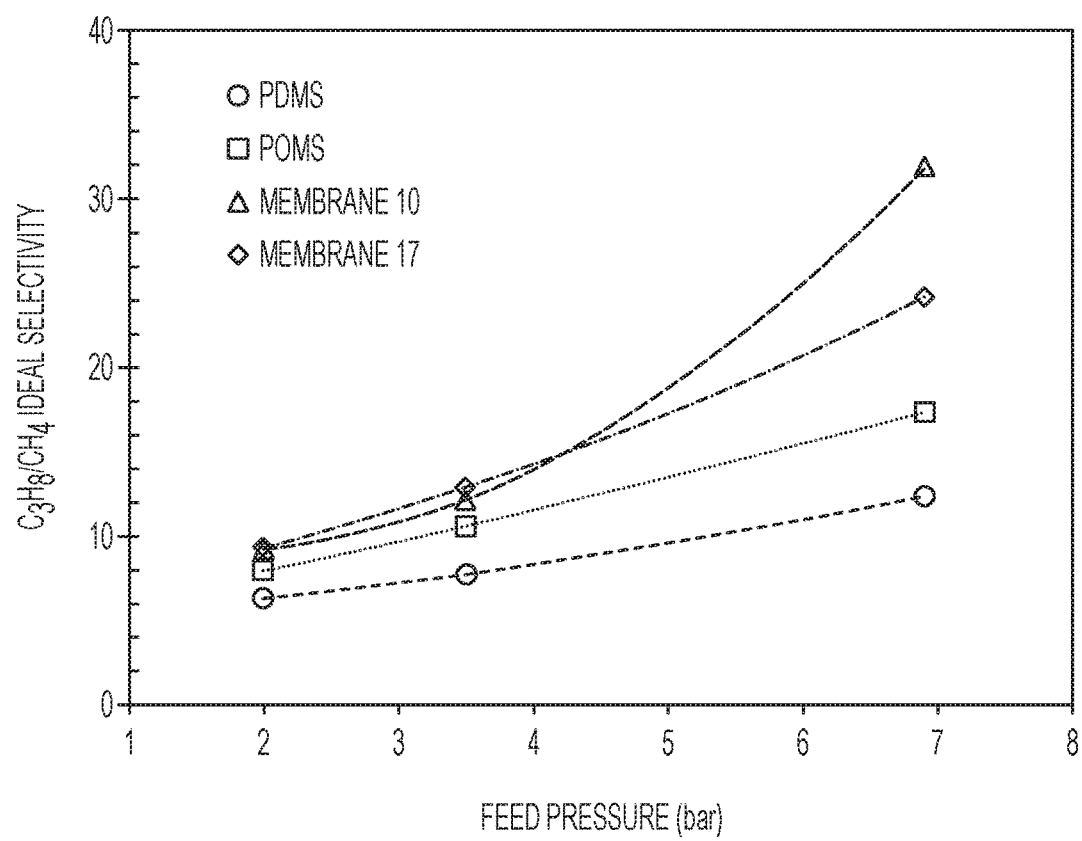
FIG. 21 is a graph of $C_3H_8/CH_4$ ideal selectivity in composite membranes according to embodiments, PDMS, and POMS, all measured at 25° C., over a feed pressure range of 7 psi to 30 psi.

The effect of feed pressure on $C_3H_8/CH_4$ ideal selectivity in Composite Membrane 10 and Composite Membrane 17, PDMS, and POMS was measured at 25° C., over a feed pressure range of 2.0 bar to 7.0 bar. The data are summarized in FIG. 21. At all feed pressures tested, the modified membranes had greater $C_3H_8/CH_4$ ideal selectivity than that of both the PDMS membrane and the POMS membrane. The $C_3H_8/CH_4$ ideal selectivity of all membranes increased with increasing feed pressure, with the increase being most pronounced for Composite Membrane 10 and Composite Membrane 17. For example, at feed pressure 2.0 bar, Composite Membrane 10 had a $C_3H_8/CH_4$ ideal selectivity of about 9.3, which increased by about 245% to about 32 at 7.0 bar, while Composite Membrane 17 had a $C_3H_8/CH_4$ ideal selectivity of about 9.3, which increased by about 127% to about 24 at 7.0 bar. In comparison, the corresponding increase for POMS was about 117% (8.0 at 2.0 bar and 17.4 at 7.0 bar), and the corresponding increase for PDMS was about 95% (6.4 at 2.0 bar and 12.4 at 7.0 bar).

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A composite membrane comprising a polymer material that is selectively permeable to heavy hydrocarbons having three or more carbon atoms over methane, the polymer material comprising a first copolymer having a polysiloxane backbone according to formula (I):

$$M\text{-}O\text{-}(A^1)_d\text{-}(A^2)_p\text{-}(A^3)_m\text{-}M \quad (I)$$

in which:
    each $A^1$ is a dimethylsiloxyl monomer;
    each $A^2$ is independently chosen from substituted methylsiloxyl monomers having formula (M1):

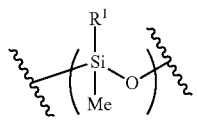
(M1)

each $A^3$ is independently chosen from internal-network monomers having formula (M2):

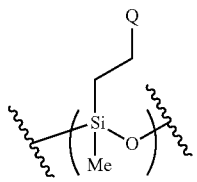
(M2)

each Q is independently selected from the group consisting of —Si($R^2$)$_3$, —Si(O$R^2$)$_3$, $R^3$, $R^4$, $Z^1$, $R^5$, and —(CH$_2$)$_z$—$R^5$ in which z is an integer from 1 to 10;
    each $R^1$ is independently chosen from a $C_5$-$C_{10}$ alkyl or phenyl;
    each $R^2$ is independently a $C_1$-$C_{20}$ alkyl;
    each $R^3$ is chosen independently from structures having formula (Q1):

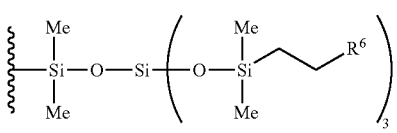
(Q1)

where each $R^6$ is $R^4$ or $R^5$, and at least one $R^6$ is $R^4$;
    each $R^4$ is chosen independently from structures having formula (Q2) or formula (Q3):

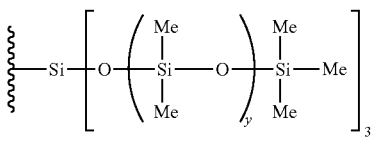
(Q2)

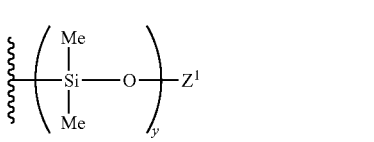
(Q3)

where each y in formula (Q2) and formula (Q3) is an integer from 1 to 850; and each $R^5$ is a crosslinking group having formula (X1):

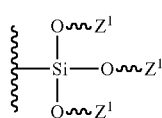
(X1)

each $Z^1$ is a crosslinking site to a second copolymer having a polysiloxane backbone;
    subscripts d, p, and m represent molar fractions of randomly arranged monomers $A^1$, $A^2$, and $A^3$ in the polysiloxane backbone;
    p is from 0 to 0.50;
    when p is 0, at least one monomer $A^3$ is —(CH$_2$)$_z$—$R^5$;
    m is from 0.01 to 0.20;
    d+p+m≤1; and
    each M is a terminal silyl group.

2. The composite membrane of claim 1, wherein p is from 0.20 to 0.50.

3. The composite membrane of claim 2, wherein each $R^1$ is $C_5$-$C_{10}$ alkyl.

4. The composite membrane of claim 2, wherein each $R^1$ is octyl.

5. The composite membrane of claim 2, wherein each $R^1$ is phenyl.

6. The composite membrane of claim 1, further comprising a porous support layer and a base support that provide structural support to the polymer material, wherein the polymer material is coated onto a porous support layer, and the porous support later is interposed between the polymer material and the base support.

7. The composite membrane of claim 6, wherein the base support is a nonwoven material.

8. The composite membrane of claim 6, wherein the nonwoven material is selected from the group consisting of poly(ethylene terephthalate), cellulose acetates, polyethylene, polypropylene, poly(alkylamides), and poly(aryl amides).

9. The composite membrane of claim 6, wherein the porous support layer is a microporous material selected from the group consisting of polyacrylonitriles, poly(vinylidene fluorides), polycarbonates, polyamides, cellulose acetates, polymer sulfones, polyether ketones, polyetherether ketones, and polyether sulfones.

10. The composite membrane of claim 1, comprising at least one internal-network monomer $A^3$ in which group Q is $Z^1$, and the second copolymer has a polysiloxane backbone according to formula (II):

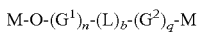
(II)

in which:
    each $G^1$ is independently chosen from substituted methylsiloxyl monomers having formula (G1):

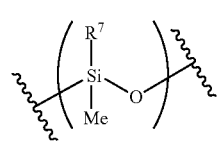
(G1)

where $R^7$ is selected from the group consisting of hydrogen, $C_1$-$C_{10}$ alkyl, and $C_6$-$C_{10}$ aryl; and each $G^2$ is independently chosen from internal-network monomers having formula (G2):

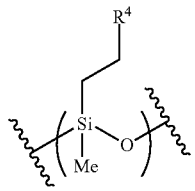
(G2)

where $R^4$ is chosen from structures having formula (Q2):

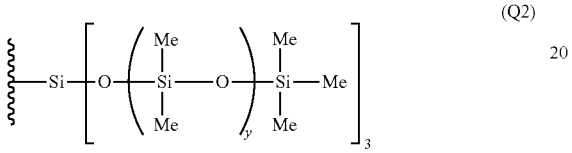
(Q2)

where each y in formula (Q2) is an integer from 1 to 50;

each L is a linking monomer having formula (G3):

(G3)

where $Z^2$ is a crosslinking site to either the first copolymer or an additional copolymer;

the $Z^2$ of at least one linking monomer L of the second copolymer is a crosslinking site to the first copolymer;

subscripts n, b, and q represent molar fractions of randomly arranged monomers of the second copolymer;

b is from 0.01 to 0.5;

q is from 0 to 0.05;

$n+b+q \leq 1$; and each M is a terminal siloxyl group.

11. The composite membrane of claim 10, wherein p is from 0.20 to 0.50.

12. The composite membrane of claim 1, wherein:
p is from 0.20 to 0.50;
each $R^1$ is octyl; and
each Q is $R^3$.

13. The composite membrane of claim 1, wherein:
p is from 0.20 to 0.50;
each $R^1$ is octyl or phenyl;
each Q is a crosslinking site $Z^1$ to a second copolymer having a polysiloxane backbone according to formula (II):

M-O-$(G^1)_n$-$(L)_b$-$(G^2)_q$-M (II)

in which:
each $G^1$ is a dimethylsiloxyl monomer;
each $G^2$ is independently chosen from internal-network monomers having formula (G2):

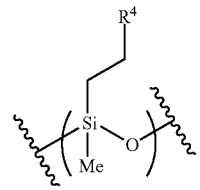
(G2)

where $R^4$ is chosen from structures having formula (Q2):

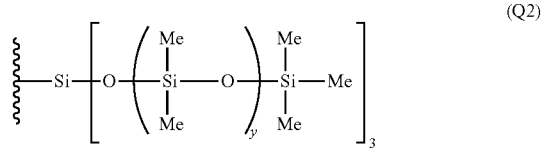
(Q2)

where each y in formula (Q2) is an integer from 1 to 850;

each L is a linking monomer having formula (G3):

(G3)

where $Z^2$ is the crosslinking site $Z^1$ of the first copolymer;

subscripts n, b, and q represent molar fractions of randomly arranged monomers of the second copolymer;

b is from 0.01 to 0.5;

q is from 0.001 to 0.05;

$n+b+q=1$; and each M is a terminal silyl group.

14. The composite membrane of claim 1, wherein:
p is from 0.20 to 0.50;
each $R^1$ is octyl;
the internal-network monomers $A^3$ are selected from the group consisting of:
(a) alkylsilyl monomers according to formula (M2) in which Q is —Si$(R^2)_3$,
(b) alkoxysilyl monomers according to formula (M2) in which Q is —Si$(OR^2)_3$,
(c) crosslinking monomers according to formula (M2) in which Q is a crosslinking site $Z^1$ to a second copolymer having a polysiloxane backbone according to formula (II):

M-O-$(G^1)_n$-$(L)_b$-$(G^2)_q$-M (II)

in which:
each $G^1$ is independently chosen from substituted methylsiloxyl monomers having formula (G1):

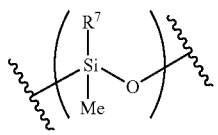

(G1)

where R⁷ is selected from the group consisting of $C_1$-$C_{10}$ alkyl and $C_6$-$C_{10}$ aryl; and each L is a linking monomer having formula (G3):

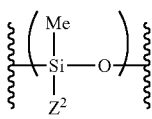

(G3)

where $Z^2$ is the crosslinking site $Z^1$ of the first copolymer;

subscripts n, b, and q represent molar fractions of randomly arranged monomers of the second copolymer;

b is from 0.01 to 0.5;

q is 0;

n+b+q=1; and each M is a terminal silyl group; and (d) combinations of any of (a), (b), and (c).

15. The composite membrane of claim 14, wherein the internal-network monomers $A^3$ comprise at least one crosslinking monomer.

16. The composite membrane of claim 15, wherein each R⁷ is selected from the group consisting of methyl, octyl, and phenyl.

17. The composite membrane of claim 15, wherein each R⁷ is methyl.

18. The composite membrane of claim 15, wherein each R⁷ is octyl.

19. The composite membrane of claim 15, wherein each R⁷ is phenyl.

20. The composite membrane of claim 14, wherein the internal-network monomers $A^3$ comprise at least one alkylsilyl monomer, at least one alkoxysilyl monomer, and at least one crosslinking monomer.

21. The composite membrane of claim 1, wherein:

p is from 0.20 to 0.50;

each $R^1$ is octyl; and each Q is selected from the group consisting of —Si($R^2$)₃ and $R^5$.

22. The composite membrane of claim 21, wherein the internal-network monomers $A^3$ are selected from the group consisting of:

(a) alkylsilyl monomers according to formula (M2) in which Q is —Si($R^2$)₃, (b) crosslinking monomers according to formula (M2) in which Q is $R^5$, and (c) combinations of (a) and (b).

23. The composite membrane of claim 22, wherein each $R^2$ is methyl or ethyl.

24. The composite membrane of claim 21, wherein the internal-network monomers $A^3$ comprise:

at least one alkylsilyl monomer according to formula (M2) in which Q is —Si($R^2$)₃; and at least one crosslinking monomer according to formula (M2) in which Q is $R^5$.

25. The composite membrane of claim 1, wherein the internal-network monomers $A^3$ are selected from the group consisting of:

(a) monomers according to formula (M2) in which Q is $R^3$, (b) crosslinking monomers according to formula (M2) in which Q is —(CH₂)_z—$R^5$, and (c) combinations of (a) and (b).

26. The composite membrane of claim 25, wherein p is 0.

27. The composite membrane of claim 25, wherein the internal-network monomers $A^3$ comprise:

at least one monomer according to formula (M2) in which Q is $R^3$; and at least one crosslinking monomer according to formula (M2) in which Q is —(CH₂)_z—$R^5$.

28. The composite membrane of claim 25, wherein the internal-network monomers $A^3$ comprise:

at least one monomer according to formula (M2) in which Q is $R^3$; and at least one crosslinking monomer according to formula (M2) in which Q is —(CH₂)_z—$R^5$, where z is 1.

29. The composite membrane of claim 1, wherein:

p is from 0.20 to 0.50;

each $R^1$ is $C_5$-$C_{10}$ alkyl, octyl, or phenyl;

each Q is a crosslinking site $Z^1$ to a second copolymer having a polysiloxane backbone according to formula (II):

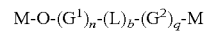

(II)

in which:

each $G^1$ is independently chosen from substituted methylsiloxyl monomers having formula (G1):

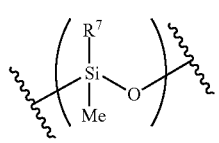

(G1)

where R⁷ is selected from the group consisting of hydrogen, $C_1$-$C_{10}$ alkyl, and $C_6$-$C_{10}$ aryl;

each L is a linking monomer having formula (G3):

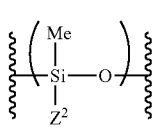

(G3)

where $Z^2$ is the crosslinking site $Z^1$ of the first copolymer;

subscripts n and b represent molar fractions of randomly arranged monomers of the second copolymer;

n is from 0.005 to 0.55;

n+b=1; and each M is a terminal silyl group.

30. The composite membrane of claim 29, wherein each R⁷ is hydrogen.

31. The composite membrane of claim 29, wherein each R⁷ is methyl.

32. The composite membrane of claim 29, wherein:
each $R^7$ is octyl; and
n is from 0.25 to 0.3.

33. The composite membrane of claim 29, wherein:
each $R^7$ is phenyl; and
n is from 0.45 to 0.50.

34. The composite membrane of claim 1, wherein:
p is from 0.20 to 0.50;
each $R^1$ is phenyl;
each Q is a group $R^4$.

35. A system for removing heavy hydrocarbons from natural gas, the system comprising:
a separator unit comprising an inlet, a retentate outlet, and a permeate outlet;
a source of natural gas in fluidic communication with the inlet of the separator unit;
at least one composite membrane according to claim 1 configured within the separator unit to prevent a flow of fluids from the inlet to the permeate outlet without first passing through the at least one composite membrane and to permit the flow of fluids to proceed from the inlet to the retentate outlet without passing through the at least one composite membrane;
a retentate collector in fluidic communication with the retentate outlet of the separator unit; and
a permeate collector in fluidic communication with the permeate outlet of the separator unit.

36. The system of claim 35, wherein the permeate collector collects a permeate comprising heavy hydrocarbons having at least three carbon atoms.

37. The system of claim 35, wherein p is from 0.20 to 0.50.

38. The system of claim 37, wherein each $R^1$ is octyl or phenyl.

39. The system of claim 35, wherein the polymer material of the composite membrane is coated onto a porous support layer, and the porous support later is interposed between the polymer material and the nonwoven material.

40. The system of claim 39, wherein the nonwoven material is poly(ethylene terephthalate) and the porous support layer is selected from the group consisting of polyacrylonitrile, poly(vinylidene fluoride), and polyether sulfone.

41. A method for removing heavy hydrocarbons having at least three carbon atoms from a natural gas stream containing methane and an initial volume fraction of the heavy hydrocarbons, the method comprising:
introducing the natural gas stream at a feed pressure into a separator unit comprising an inlet, a retentate outlet, a permeate outlet, and at least one composite membrane according to claim 1, configured within the separator unit to prevent a flow of fluids from the inlet to the permeate outlet without first passing through the at least one composite membrane and to permit the flow of fluids to proceed from the inlet to the retentate outlet without passing through the at least one composite membrane; and
collecting at least one of:
a retentate from the retentate outlet, the retentate having a reduced volume fraction of the heavy hydrocarbons, the reduced volume fraction being less than the initial volume fraction; or
a permeate from the permeate outlet, the permeate having an increased volume fraction of the heavy hydrocarbons, the increased volume fraction being greater than the initial volume fraction.

42. The method of claim 41, wherein the feed pressure is from 1 bar to 10 bar.

43. The method of claim 41, wherein the separator unit is at a separation temperature of from 20° C. to 100° C.

* * * * *

UNITED STATES PATENT AND TRADEMARK OFFICE
CERTIFICATE OF CORRECTION

PATENT NO. : 10,293,301 B2
APPLICATION NO. : 15/428662
DATED : May 21, 2019
INVENTOR(S) : John Yang et al.

It is certified that error appears in the above-identified patent and that said Letters Patent is hereby corrected as shown below:

In the Specification

In Column 25, Line 46, delete "w-alkenyltrialkoxysilane" and insert --ω-alkenyltrialkoxysilane--, therefor.

In Column 25, Line 49, delete "w-alkenyl" and insert --ω-alkeny--, therefor.

In Column 25, Line 51, delete "w-alkenyl" and insert --ω-alkeny--, therefor.

In Column 25, Line 51 & 52, delete "w-alkenyltrialkoxysilane" and insert --ω-alkenyltrialkoxysilane--, therefor.

Signed and Sealed this
Fourth Day of August, 2020

Andrei Iancu
*Director of the United States Patent and Trademark Office*